United States Patent
Makii

(10) Patent No.: US 12,269,577 B2
(45) Date of Patent: Apr. 8, 2025

(54) PROPELLER ATTACHING DEVICE AND PROPELLER ATTACHING METHOD

(71) Applicant: Sony Group Corporation, Tokyo (JP)

(72) Inventor: Tatsuo Makii, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 12 days.

(21) Appl. No.: 17/999,053

(22) PCT Filed: Jun. 17, 2021

(86) PCT No.: PCT/JP2021/023001
§ 371 (c)(1),
(2) Date: Nov. 17, 2022

(87) PCT Pub. No.: WO2021/261369
PCT Pub. Date: Dec. 30, 2021

(65) Prior Publication Data
US 2023/0192272 A1    Jun. 22, 2023

(30) Foreign Application Priority Data
Jun. 25, 2020 (JP) ................................. 2020-109398

(51) Int. Cl.
*B64C 11/08* (2006.01)

(52) U.S. Cl.
CPC .................................... *B64C 11/08* (2013.01)

(58) Field of Classification Search
CPC ...... B65D 50/046; B65D 2215/02; A61J 1/03; B64C 11/04; B64C 11/08; B64C 11/10;
(Continued)

(56) References Cited

U.S. PATENT DOCUMENTS

| 11,364,998 B2* | 6/2022 | Yoon ...................... B64C 11/04 |
| 2019/0039719 A1* | 2/2019 | Baek ...................... B64U 10/14 |

(Continued)

FOREIGN PATENT DOCUMENTS

| CN | 106715264 A | 5/2017 |
| CN | 206407108 U | 8/2017 |

(Continued)

OTHER PUBLICATIONS

International Search Report and Written Opinion mailed on Jul. 13, 2021, received for PCT Application PCT/JP2021/023001, filed on Jun. 17, 2021, 11 pages including English Translation.

*Primary Examiner* — Michael K. Reitz
(74) *Attorney, Agent, or Firm* — XSENSUS LLP

(57) ABSTRACT

A propeller attaching device includes a coupler that rotates integrally with an output shaft of a motor, a movable body, and a resilient body. The coupler allows attachment/detachment of an attachment portion of the motor by rotation of the propeller in the circumferential direction and restricts the movement of the propeller in an axial direction. The movable body includes a second receiving portion, and is supported by the coupler so as to be movable in the axial direction. The attachment/detachment position is a position where attachment/detachment of the attachment portion to/from the first receiving portion is allowed. The restriction position is positioned in a first direction relative to the attachment/detachment position, the first direction extending from the other end to one end of the output shaft in the axial direction of the output shaft, and restricts the rotation of the propeller in the circumferential direction relative to the base.

16 Claims, 28 Drawing Sheets

(58) Field of Classification Search
CPC ....... B64C 11/12; B64C 11/14; B64U 30/291; Y10T 403/7005; Y10T 403/7007; F01D 29/329; F01D 29/263; F01D 5/025
See application file for complete search history.

(56) References Cited

U.S. PATENT DOCUMENTS

| | | |
|---|---|---|
| 2019/0210719 A1 | 7/2019 | Goldstein et al. |
| 2021/0047023 A1* | 2/2021 | Hu .................. F16D 1/112 |

FOREIGN PATENT DOCUMENTS

| | | |
|---|---|---|
| CN | 111319761 A | 6/2020 |
| JP | 2017-534517 A | 11/2017 |
| JP | 2018-500507 A | 1/2018 |
| JP | 2018-528120 A | 9/2018 |
| JP | 2018-533523 A | 11/2018 |
| JP | 2020-501485 A | 1/2020 |

* cited by examiner of # PROPELLER ATTACHING DEVICE AND PROPELLER ATTACHING METHOD

CROSS-REFERENCE TO RELATED APPLICATIONS

The present application is based on PCT filing PCT/JP2021/023001, filed Jun. 17, 2021, which claims priority to Japanese Application No. 2020-109398, filed Jun. 25, 2020, the entire contents of each are incorporated herein by reference.

FIELD

The present disclosure relates to a propeller attaching device and a propeller attaching method.

BACKGROUND

There is a propeller attaching device to attach a propeller to an output shaft of a motor by using a resilient force of a resilient body where the output shaft is inserted into a through-hole provided in the propeller.

CITATION LIST

Patent Literature

Patent Literature 1: JP 2017-534517 W

SUMMARY

Technical Problem

However, in the conventional structure as described above, when the propeller catches a strong wind or the like, a load acts on the resilient body from the propeller, and thus, there is a possibility that attachment reliability of the propeller is reduced.

Therefore, the present disclosure proposes a propeller attaching device and a propeller attaching method that provide improved attachment reliability of a propeller to an output shaft of a motor.

Solution to Problem

A propeller attaching device according to the present disclosure includes: a coupler that includes a base and a first receiving portion, the base having a through-hole into which a protruding portion of an output shaft of a motor is inserted, the protruding portion including one end of the output shaft, the base being coupled to the output shaft, the first receiving portion allowing attachment/detachment of an attachment portion of a propeller by rotation of the propeller in a circumferential direction of the output shaft relative to the base, the propeller having the attachment portion and provided with an opening into which the protruding portion protruding from the through-hole is inserted, the first receiving portion receiving the attachment portion in an axial direction of the output shaft to restrict movement of the propeller in the axial direction, the coupler rotating integrally with the output shaft; a movable body that includes a second receiving portion, is supported by the coupler to be movable in the axial direction between an attachment/detachment position and a restriction position, and rotates integrally with the coupler, the attachment/detachment position allowing attachment/detachment of the attachment portion to/from the first receiving portion, the restriction position being located in a first direction relative to the attachment/detachment position, the first direction extending from the other end portion of the output shaft toward the one end portion in the axial direction of the output shaft, the restriction position receiving the attachment portion attached to the first receiving portion in the circumferential direction by the second receiving portion to restrict the rotation of the propeller in the circumferential direction relative to the base; and a resilient body that presses the movable body in the first direction and rotates integrally with the coupler.

DESCRIPTION OF EMBODIMENTS

Figure 1:
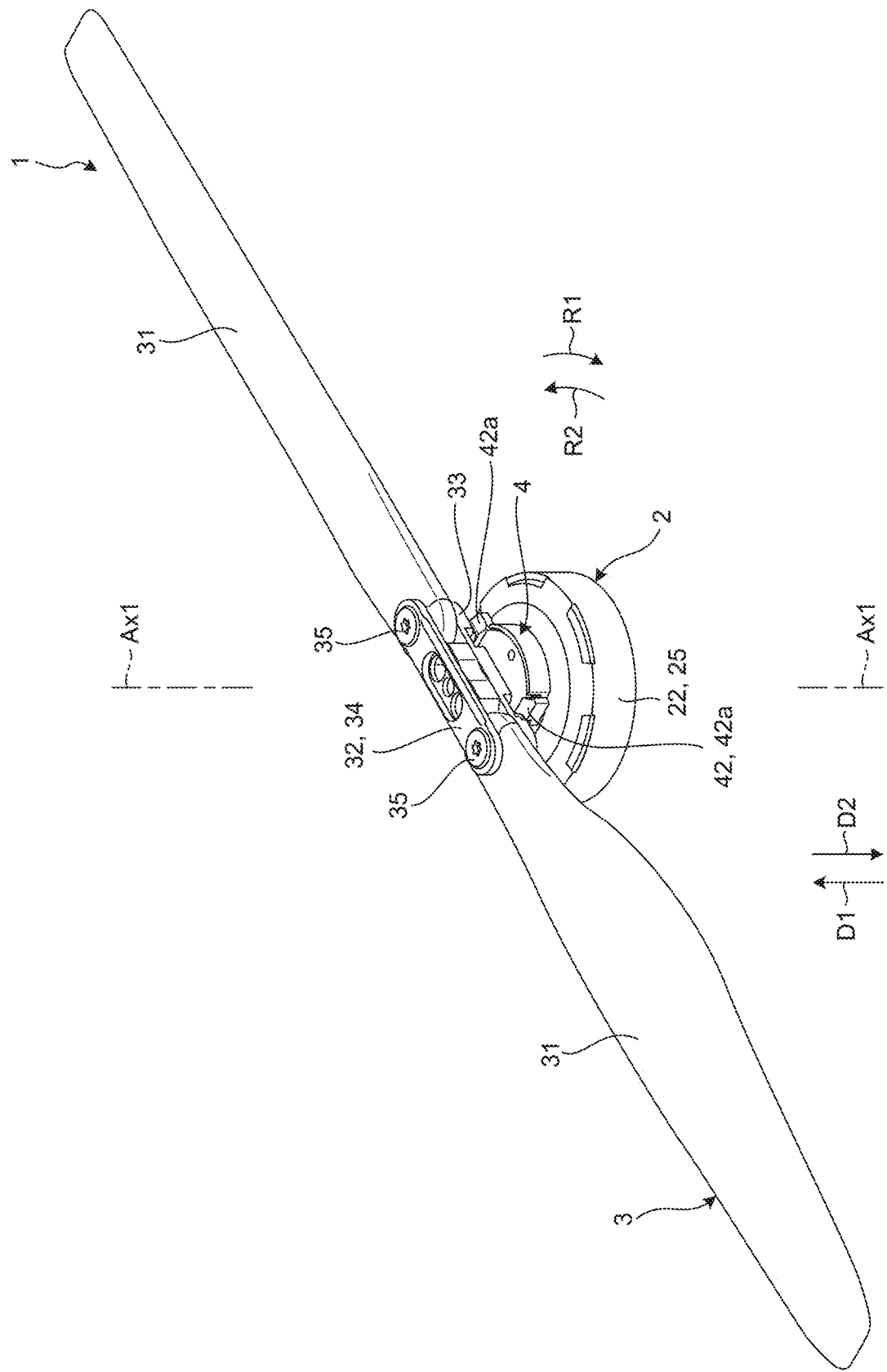
FIG. 1 is a perspective view of a propeller propulsion system according to a first embodiment of the present disclosure, viewed obliquely from above the propeller propulsion system.

The embodiments of the present disclosure will be described in detail below with reference to the drawings. Note that in the following embodiments, the same portions are denoted by the same reference numerals or symbols, and repetitive description thereof will be omitted.

The description is given in the following order.
[1. First Embodiment]
 [1-1. Configuration of propeller propulsion system according to first embodiment]
 [1-2. Motor]
 [1-3. Propeller]
 [1-4. Propeller attaching device]
 [1-5. Operation]
 [1-6. Propeller attaching method and propeller removing method]
 [1-7. Effects]
 [1-8. Reference Example]
[2. Second Embodiment]
 [2-1. Configuration of propeller propulsion system according to second embodiment]
 [2-2. Motor and propeller attaching device]
 [2-3. Propeller attaching method and propeller removing method]
 [2-4. Effects]
 [2-5. Modifications]

1. First Embodiment

[1-1. Configuration of Propeller Propulsion System According to First Embodiment]

Figure 2:
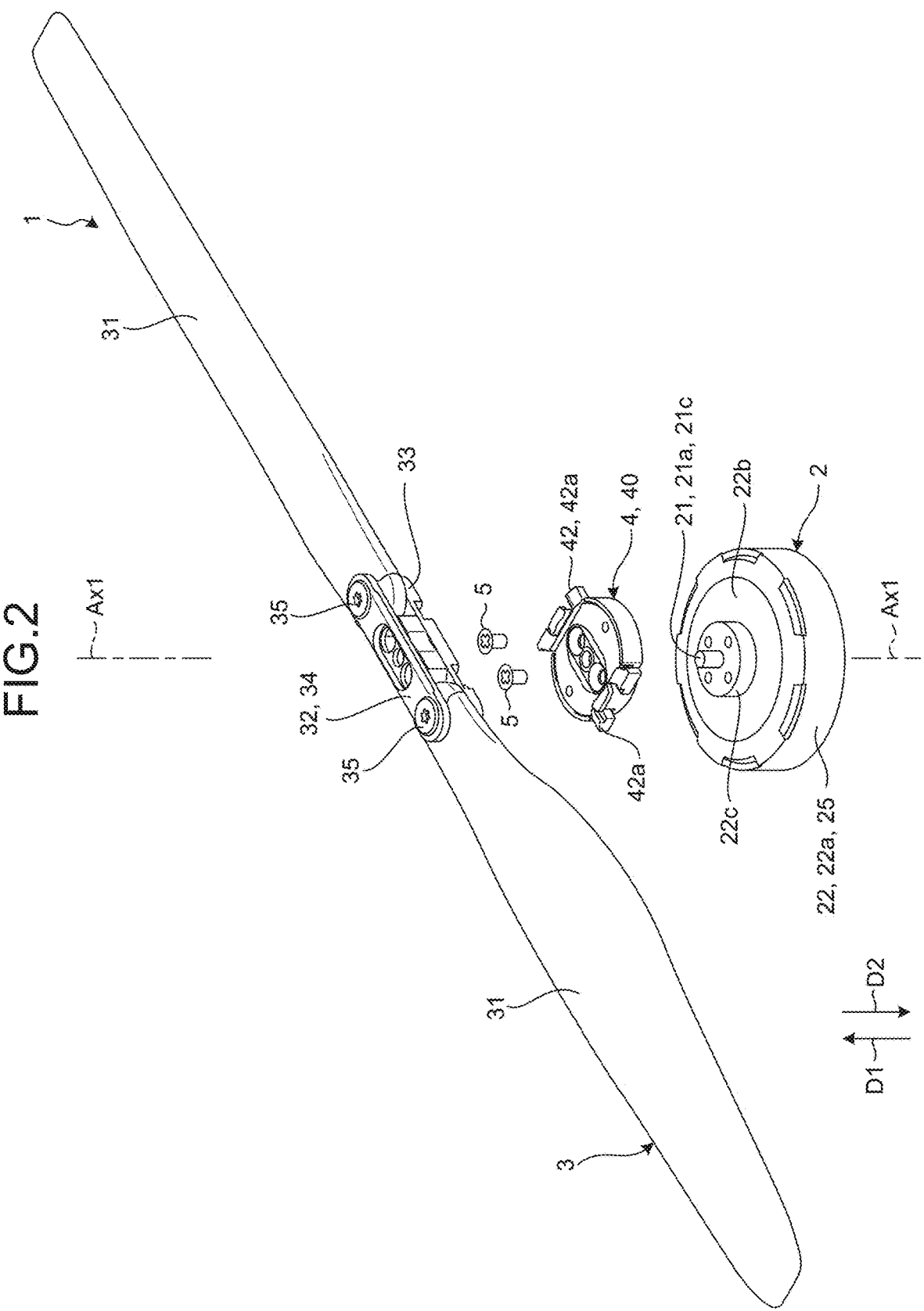
FIG. 2 is an exploded perspective view of the propeller propulsion system according to the first embodiment.
Figure 3:
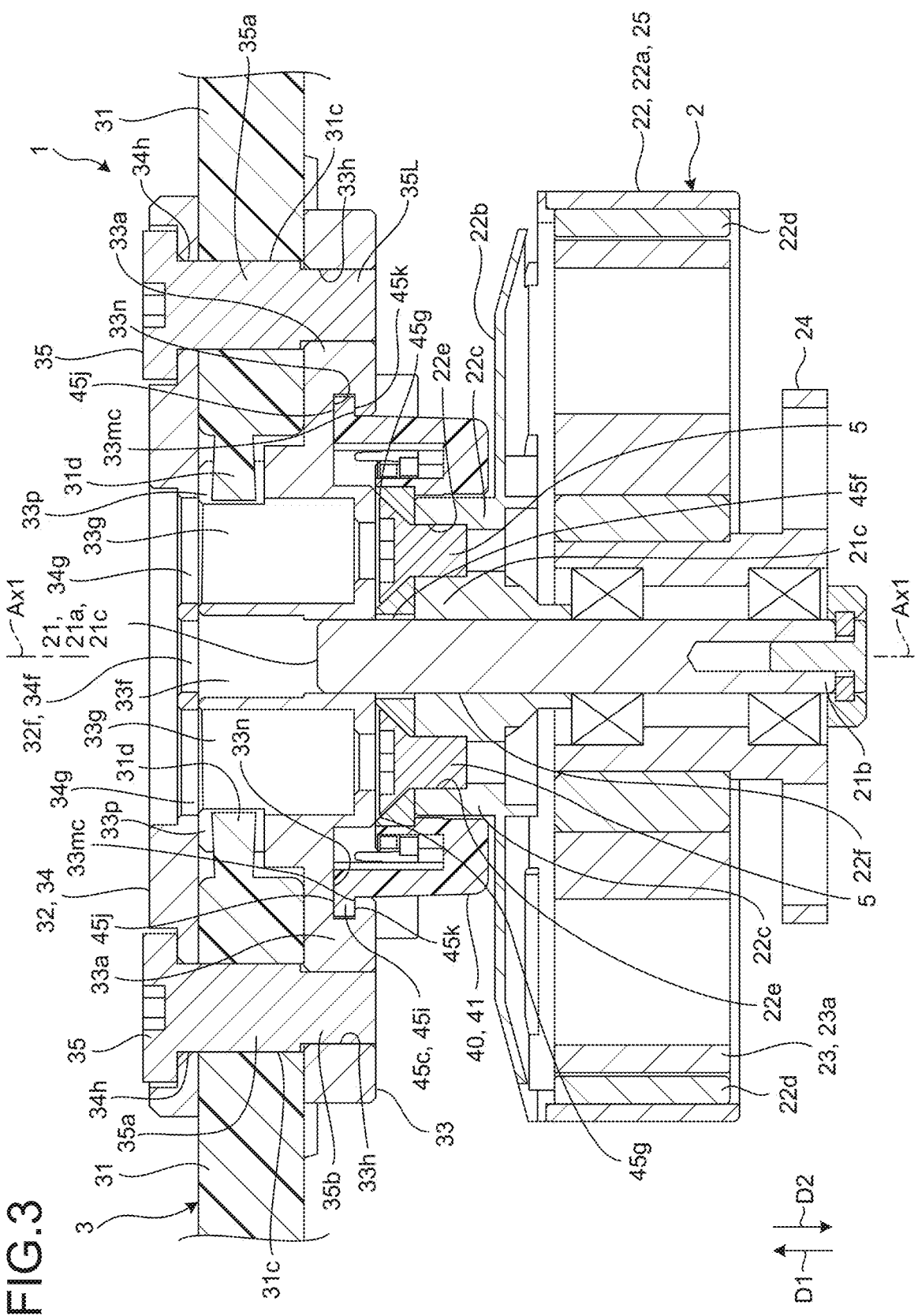
FIG. 3 is a cross-sectional view of the propeller propulsion system according to the first embodiment.

FIG. 1 is a perspective view of a propeller propulsion system 1 according to a first embodiment of the present disclosure, viewed obliquely from above the propeller propulsion system 1. FIG. 2 is an exploded perspective view of the propeller propulsion system 1 according to the first embodiment. FIG. 3 is a cross-sectional view of the propeller propulsion system 1 according to the first embodiment.

As illustrated in FIGS. 1 to 3, the propeller propulsion system 1 includes a motor 2, a propeller 3, and a propeller attaching device 4. The propeller 3 is detachably attached to an output shaft 21 (FIG. 2) of the motor 2 by the propeller attaching device 4. The propeller 3 and the propeller attaching device 4 rotate integrally with the output shaft 21 of the motor 2. The output shaft 21 of the motor 2, the propeller 3, and the propeller attaching device 4 rotate about a central axis Ax1. The propeller propulsion system 1 is provided on a flying object such as a drone. Note that the flying object may be a manned flying object.

[1-2. Motor]

Figure 4:
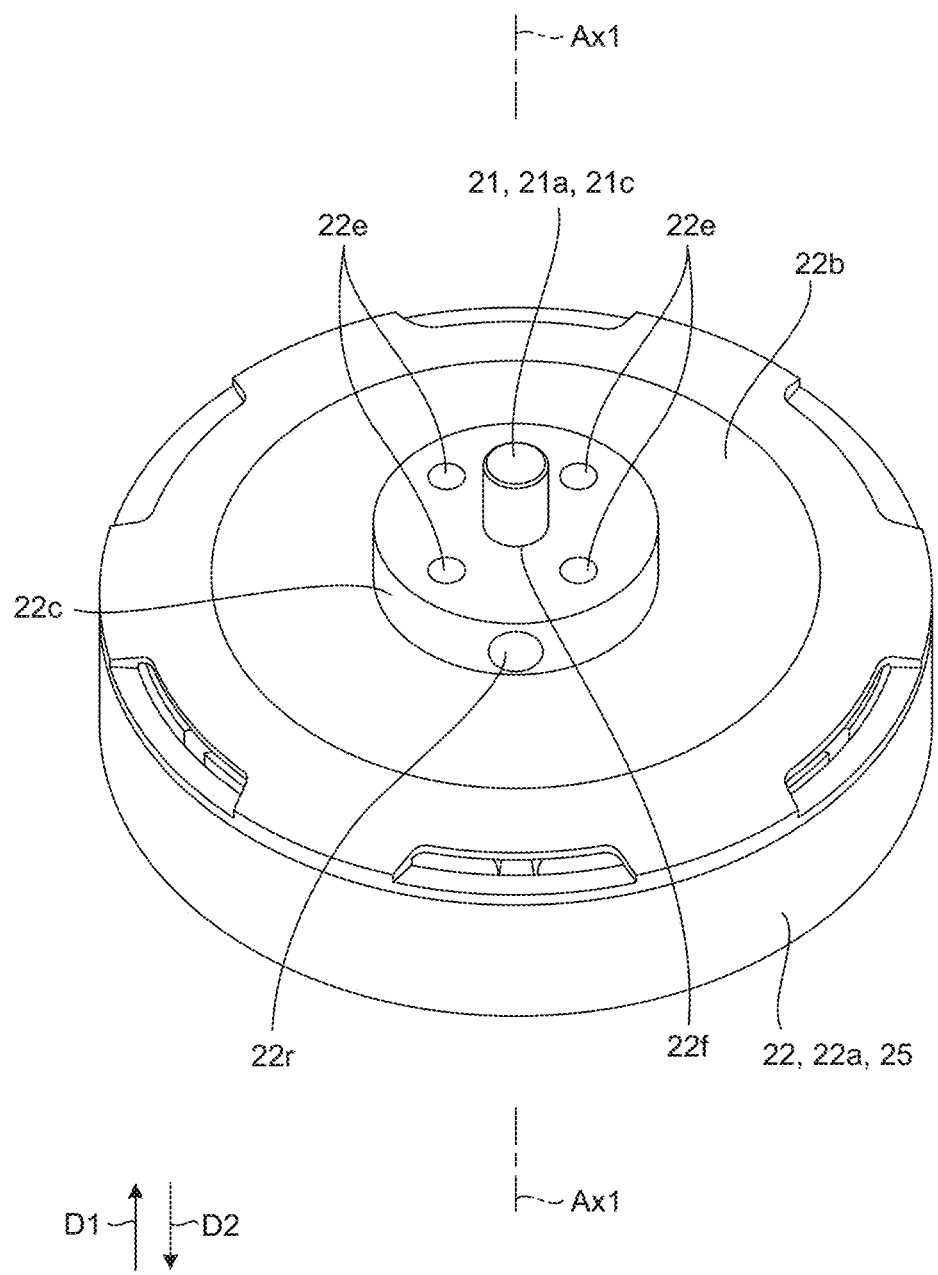
FIG. 4 is a perspective view of a motor according to the first embodiment, viewed obliquely from above the motor.
Figure 5:
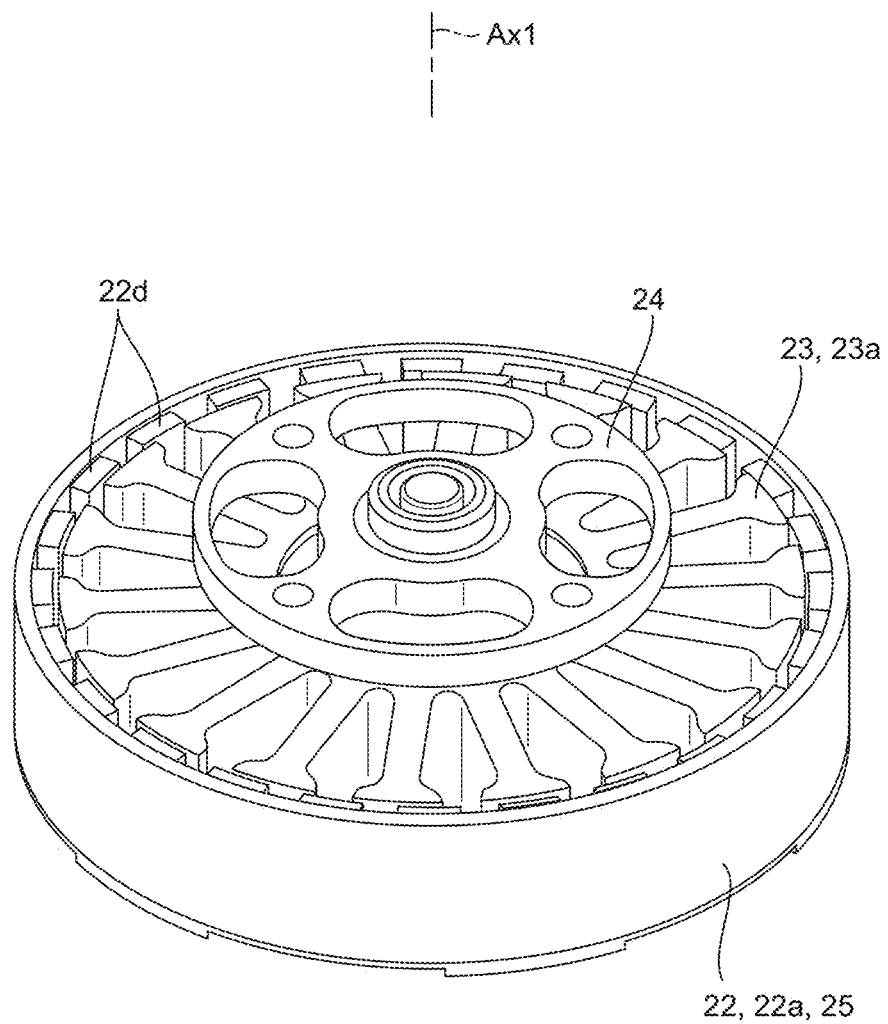
FIG. 5 is a perspective view of the motor according to the first embodiment, viewed obliquely from below the motor.

FIG. 4 is a perspective view of the motor 2 according to the first embodiment, viewed obliquely from above the motor 2. FIG. 5 is a perspective view of the motor 2 according to the first embodiment, viewed obliquely from below the motor 2.

As illustrated in FIGS. 3 to 5, the motor 2 includes the output shaft 21, a rotor 22, a stator 23, and a support 24. The rotor 22, the stator 23, and the support 24 constitute a motor body 25. The motor 2 is an outer rotor motor.

The output shaft 21 extends along the central axis Ax1. In other words, an axial direction of the output shaft 21 is along the central axis Ax1. The output shaft 21 is supported by the support 24 so as to be rotatable about the central axis Ax1. The output shaft 21 has one end 21a that is an end on one side in the axial direction and the other end 21b that is an end on the other side in the axial direction. Furthermore, the output shaft 21 includes a protruding portion 21c. The protruding portion 21c includes the one end 21a and protrudes from the motor body 25. The output shaft 21 is made of a metal material or the like.

Hereinafter, a direction from the other end 21b toward the one end 21a along the axial direction of the output shaft 21 is referred to as a first direction D1, and a direction opposite to the first direction D1 is referred to as a second direction D2. The first direction D1 extends upward in a vertical direction of the propeller propulsion system 1. The second direction D2 extends downward in the vertical direction of the propeller propulsion system 1. Furthermore, a clockwise rotation direction when the output shaft 21 is viewed from the first direction D1 is referred to as a rotation direction R1. Furthermore, a counterclockwise rotation direction when the output shaft 21 is viewed from the first direction D1 is referred to as a rotation direction R2. In the following description, unless otherwise specified, the term axial direction refers to an axial direction of the output shaft 21, the term circumferential direction refers to a circumferential direction of the output shaft 21, and the term radial direction refers to a radial direction of the output shaft 21.

The rotor 22 includes a cylinder 22a, a lid 22b, and a plurality of magnets 22d. The cylinder 22a and the lid 22b constitute a case. The rotor 22 rotates about the central axis Ax1, integrally with the output shaft 21.

The cylinder 22a is formed into a cylindrical shape around the output shaft 21, that is, around the central axis Ax1. The cylinder 22a is made of a metal material or the like. The lid 22b is fixed to one end of the cylinder 22a in the axial direction. The lid 22b covers an opening at the one end of the cylinder 22a.

The lid 22b has the protruding portion 21c. The protruding portion 21c protrudes in the first direction D1 from a center portion of the lid 22b. The protruding portion 21c is provided with a through-hole 22f. The output shaft 21 is inserted into the through-hole 22f. The protruding portion 21c is provided with four female threaded portions 22e. The four female threaded portions 22e are provided at spaced intervals around the through-hole 22f. Furthermore, the protruding portion 21c is provided with a hole 22r. A screw member (not illustrated) that fixes the protruding portion 21c and the output shaft 21 is inserted into the hole 22r.

The plurality of magnets 22d are fixed on the inner peripheral surface of the cylinder 22a at spaced intervals in the circumferential direction.

The stator 23 is positioned inside the rotor 22. The stator 23 is fixed to the support 24. The stator 23 includes an iron core 23a and a winding (not illustrated) wound around the iron core 23a.

The support 24 is made of a metal material or the like. The support 24 is attached to an attachment portion (not illustrated) of an airframe of the flying object.

In the motor 2 configured as described above, energization of the winding of the stator 23 rotates the rotor 22 integrally with the output shaft 21.

[1-3. Propeller]

Figure 6:
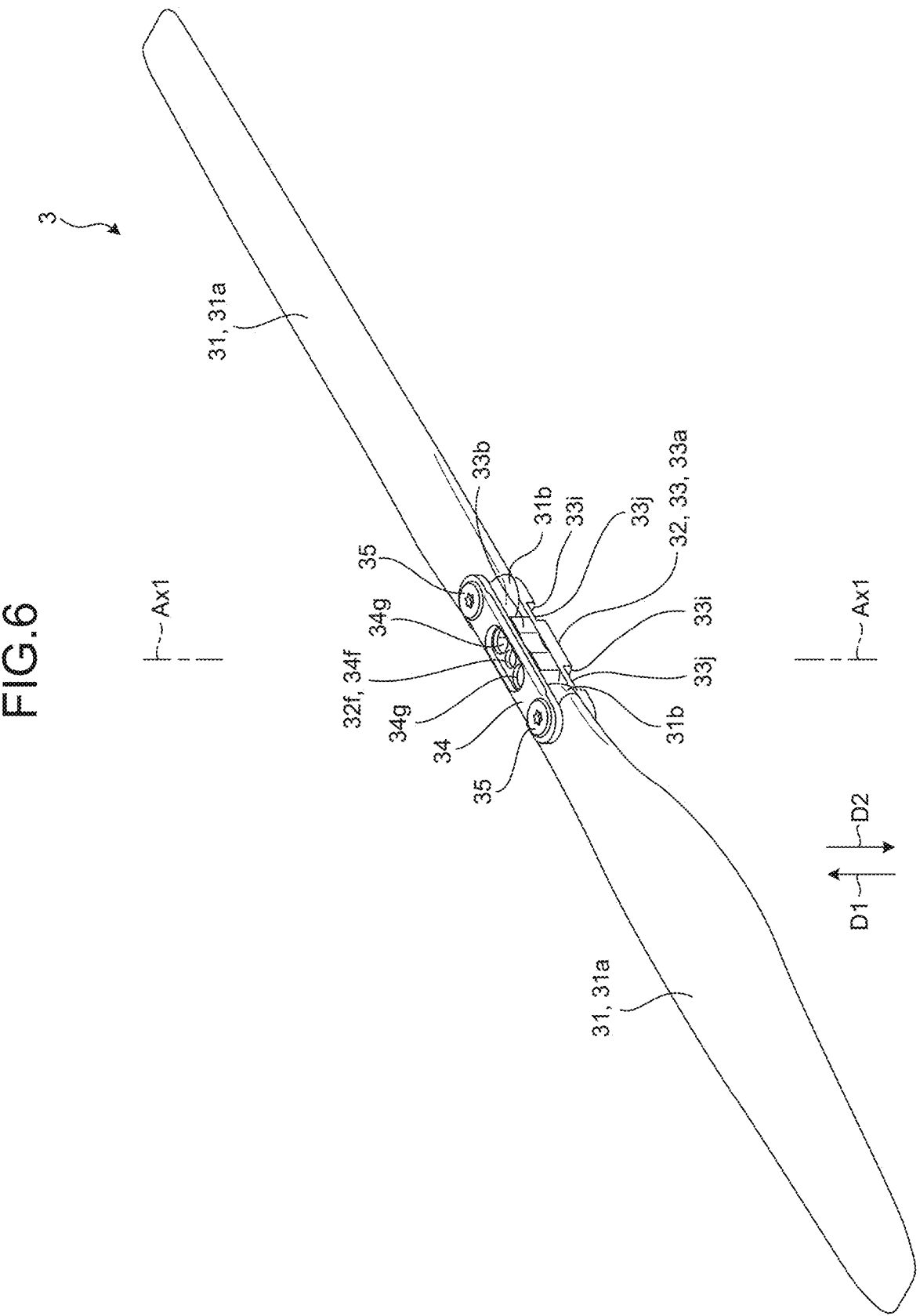
FIG. 6 is a perspective view of a propeller according to the first embodiment, viewed obliquely from above the propeller.
Figure 7:
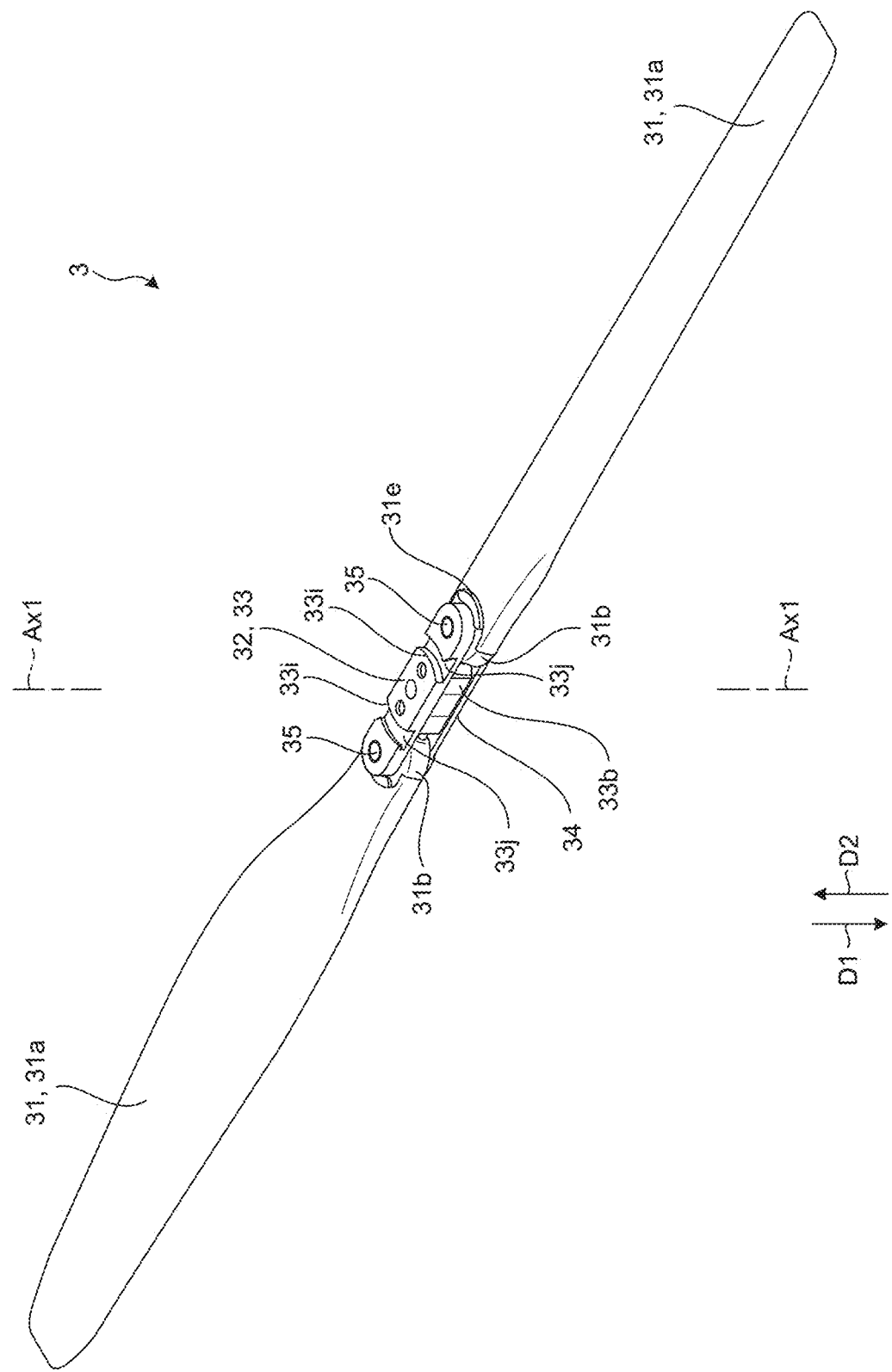
FIG. 7 is a perspective view of the propeller according to the first embodiment, viewed obliquely from below the propeller.
Figure 8:
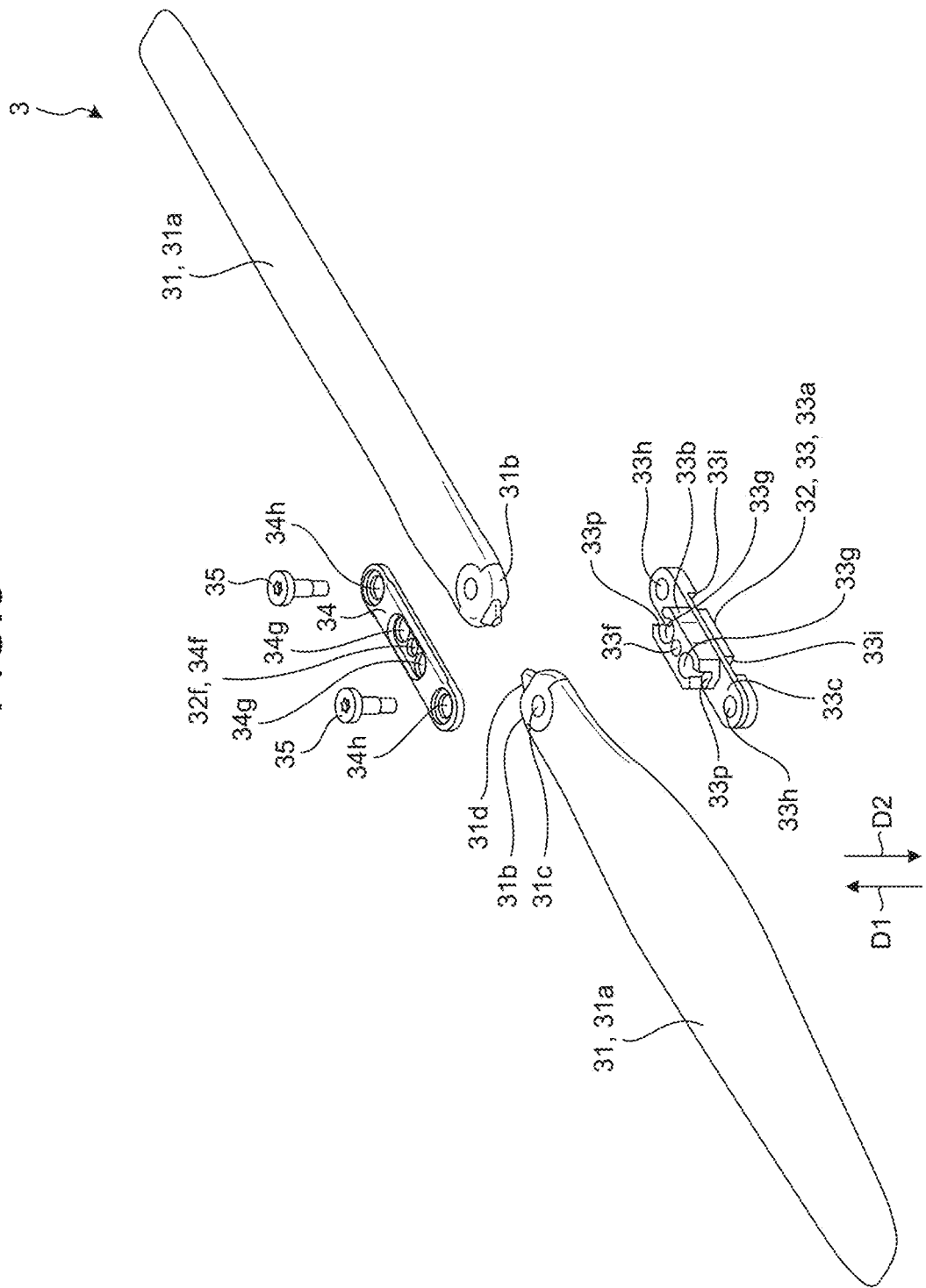
FIG. 8 is an exploded perspective view of the propeller according to the first embodiment, viewed obliquely from above the propeller.
Figure 9:
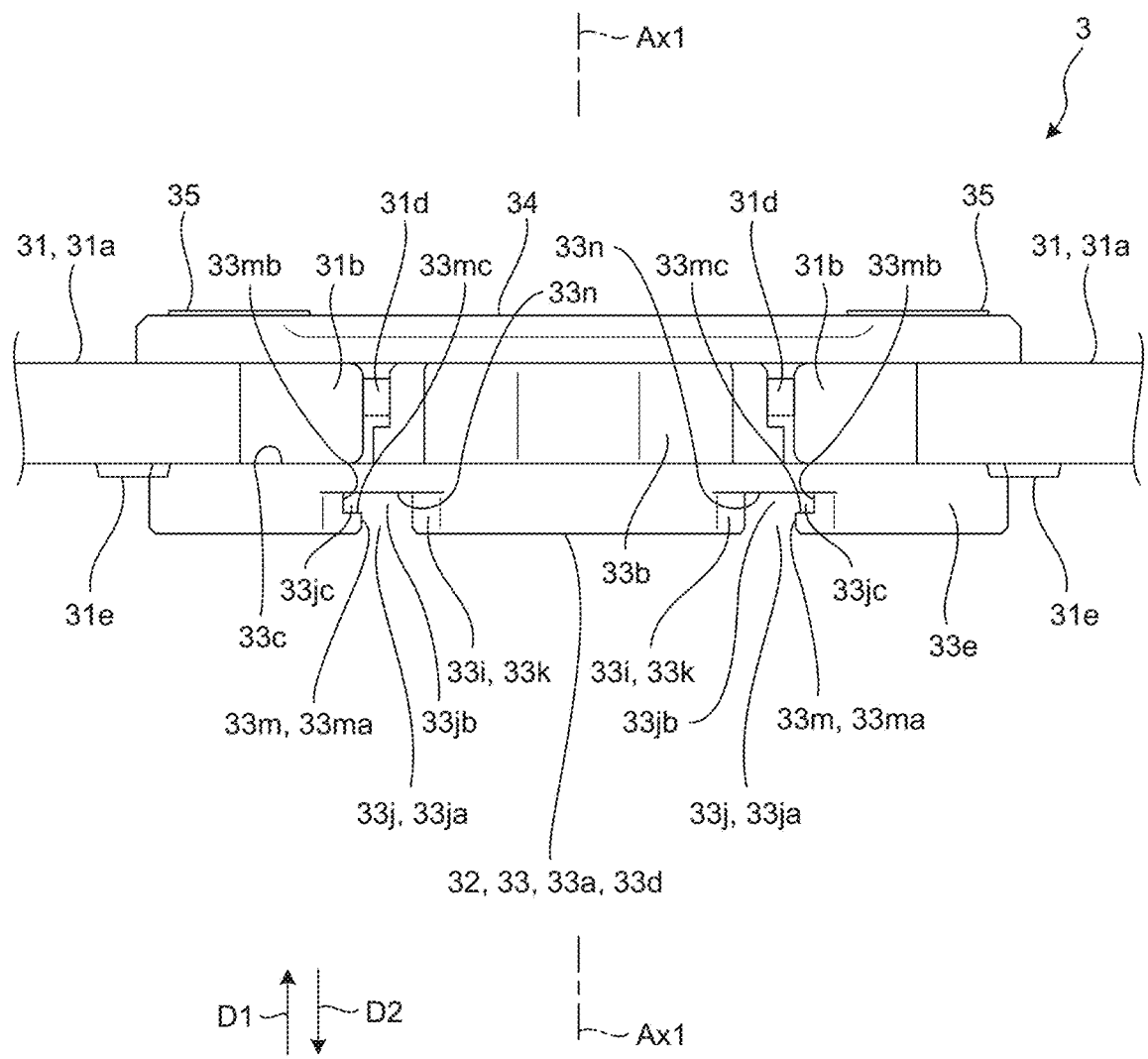
FIG. 9 is a side view of a part of the propeller according to the first embodiment.

FIG. 6 is a perspective view of the propeller 3 according to the first embodiment, viewed obliquely from above the propeller 3. FIG. 7 is a perspective view of the propeller 3 according to the first embodiment, viewed obliquely from below the propeller 3. FIG. 8 is an exploded perspective view of the propeller 3 according to the first embodiment, viewed obliquely from above the propeller 3. FIG. 9 is a side view of a part of the propeller 3 according to the first embodiment.

As illustrated in FIGS. 6 to 8, the propeller 3 includes a plurality of blades 31, a hub 32, and a plurality of connectors 35. The plurality of blades 31 are fixed to the hub 32 by a plurality of connectors 35. In an example, two blades 31 and two connectors 35 are provided, but the number of blades 31 and the number of connectors 35 are not limited thereto. In addition, the propeller 3 includes a combination of a plurality of members as an example, but is not limited thereto. For example, the propeller 3 may be constituted by a single member.

The two blades 31 are positioned on the opposite side from each other relative to the output shaft 21 (central axis Ax1). The two blades 31 extend to the opposite sides from the hub 32.

As illustrated in FIGS. 7 to 9, each of the blades 31 includes a main body 31a and protrusions 31d and 31e. Rotation of the main body 31a generates thrust. A through-hole 31c is provided at one end 31b that is an end of the main body 31a near the hub 32. The blade 31 can be made of a metal material, a synthetic resin material, or the like. Furthermore, the blade 31 may be made of carbon fiber or carbon fiber-reinforced plastic, or may be made of a mixed material containing various materials. In addition, the blade 31 may be made of the same material as a whole or may be partially made of a different material.

As illustrated in FIGS. 7 and 9, the protrusion 31e protrudes in the second direction D2 from a lower surface of the one end 31b of the main body 31a. The protrusion 31e is formed in an arcuate shape. The protrusion 31e is butted against the hub 32.

Figure 10:
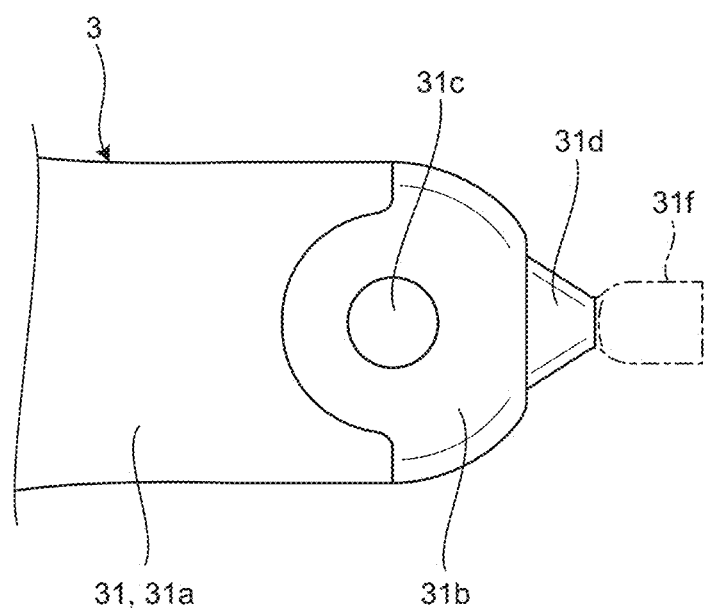
FIG. 10 is a plan view of a part of a blade of the propeller according to the first embodiment.

FIG. 10 is a plan view of a part of the blade 31 of the propeller 3 according to the first embodiment. As illustrated in FIGS. 8 and 10, the protrusion 31d protrudes from the one end 31b of the main body 31a toward the center of the propeller 3. As illustrated in FIG. 10, the protrusion 31d is a part of a gate portion 31f that is formed at a gate when the propeller 3 is formed by injection molding. The gate portion 31f is cut off at a narrowed portion.

As illustrated in FIGS. 8 and 9, the hub 32 includes a lower hub member 33 and an upper hub member 34. In a state where the lower hub member 33 and the upper hub member 34 hold the two blades 31 therebetween, the lower hub member 33, the upper hub member 34, and the two blades 31 are fixed by the connectors 35. One of the lower hub member 33 and the upper hub member 34 is also referred to as a first hub member, and the other of the lower hub member 33 and the upper hub member 34 is also referred to as a second hub member.

Figure 11:
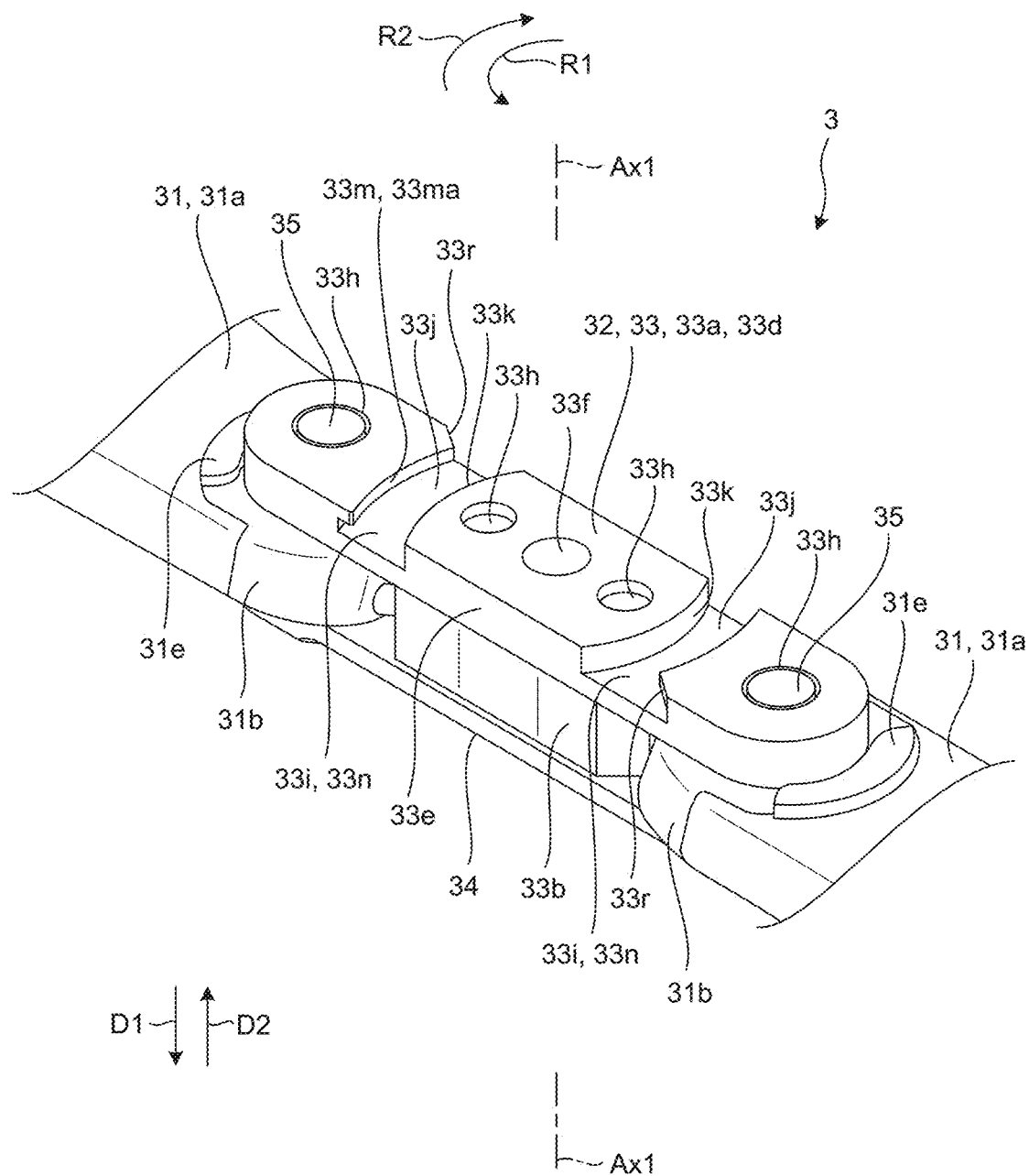
FIG. 11 is a perspective view of a center portion of the propeller according to the first embodiment, viewed obliquely from below the propeller.

FIG. 11 is a perspective view of a center portion of the propeller 3 according to the first embodiment, viewed obliquely from below the propeller 3.

As illustrated in FIGS. 8, 9, and 11, the lower hub member 33 includes an attachment portion 33a and a protrusion 33b. The lower hub member 33 can be made of a metal material, a synthetic resin material, or the like. Furthermore, the lower hub member 33 may be made of carbon fiber or carbon fiber-reinforced plastic, or may be made of a mixed material containing various materials. In addition, the lower hub member 33 may be made of the same material as a whole or may be partially made of a different material. The materials of the lower hub member 33 may be selected on the basis of necessary strength and rigidity, and cost, as appropriate.

The attachment portion 33a is formed into a flat strip shape extending in a direction orthogonal to the central axis Ax1. The attachment portion 33a has an upper surface 33c, a lower surface 33d, and a peripheral surface 33e. The upper surface 33c faces in the first direction D1. The lower surface 33d is a surface opposite to the upper surface 33c and faces in the second direction D2. The peripheral surface 33e extends between the upper surface 33c and the lower surface 33d.

The attachment portion 33a includes two received portions 33i. The two received portions 33i are a portion on one side in a longitudinal direction from a longitudinal center of the attachment portion 33a and a portion on the other side in the longitudinal direction from the longitudinal center of the attachment portion 33a. The received portions 33i are also referred to as supported portions.

As illustrated in FIGS. 9 and 11, each of the received portion 33i is provided with a groove portion 33j. The groove portion 33j is opened in the lower surface 33d and penetrates the attachment portion 33a in the circumferential direction. The groove portion 33j is curved in the circumferential direction. The groove portion 33j includes a narrow portion 33ja and a wide portion 33jb. The narrow portion 33ja is opened in the lower surface 33d. The wide portion 33jb is positioned on the side in the first direction D1 side from the narrow portion 33ja and communicates with the narrow portion 33ja. The wide portion 33jb has a portion protruding toward the narrow portion 33ja that constitutes a groove portion 33jc. The groove portion 33jc is opened radially inward and penetrates the attachment portion 33a in the circumferential direction.

The received portion 33i has an inner side surface 33k, an outer side surface 33m, and a connection surface 33n as surfaces forming the groove portion 33j. The inner side surface 33k faces radially outward and extends in the circumferential direction and the axial direction. The outer side surface 33m is positioned radially outward from the inner side surface 33k. The outer side surface 33m partially faces radially inward and extends in the circumferential direction and the axial direction. The connection surface 33n faces in the first direction D1 and connects an end of the inner side surface 33*k* in the second direction and an end of the outer side surface 33*m* in the second direction.

The outer side surface 33*m* has surfaces 33*ma*, 33*mb*, 33*mc*, and 33*r*. The surface 33*ma* extends from the lower surface 33*d* in the first direction D1 to form the narrow portion 33*ja*. The surface 33*ma* extends arcuately in the circumferential direction. The surface 33*mb* extends from the connection surface 33*n* in the second direction D2 to form the wide portion 33Jb. The surface 33*mb* extends arcuately in the circumferential direction. The surface 33*mc* connects an end of the surface 33*ma* in the first direction D1 and an end of the surface 33*mb* in the second direction D2. The surface 33*mc* faces in the second direction D2 and extends in the circumferential direction. The surface 33*r* is connected to an end of the surface 33*ma* in the rotation direction R2. The surface 33*r* is a flat surface extending toward the rotation direction R2 so as to be away from the central axis Ax1. In the propeller 3, the surface 33*r* forms a recess that is recessed relative to the surface 33*ma*.

Furthermore, the attachment portion 33*a* is provided with two female threaded portions 33*h*. Two groove portions 33*j* are provided between the two female threaded portions 33*h*. The two female threaded portions 33*h* are engaged with the connectors 35.

As illustrated in FIG. 8, the protrusion 33*b* protrudes in the first direction D1 from a center portion of the upper surface 33*c* of the attachment portion 33*a*.

The lower hub member 33 is provided with through-holes 33*f* and 33*g*. The through-hole 33*f* axially passes through a center portion of the lower hub member 33. The protruding portion 21*c* of the output shaft 21 of the motor 2 is inserted into the through-hole 33*f* (FIG. 3). The through-hole 33*g* includes two through-holes 33*g*. The two through-holes 33*g* axially passes through the lower hub member 33. The through-hole 33*f* is provided between the two through-holes 33*g*. Furthermore, the lower hub member 33 is provided with a recess 33*p* that communicates with each of the through-holes 33*g*. The recess 33*p* is provided in the protrusion 33*b*. The recess 33*p* is opened in an upper surface and a peripheral surface of the protrusion 33*b*. The protrusions 31*d* of the blades 31 are stored in the recesses 33*p* (FIG. 3).

As illustrated in FIGS. 8 and 9, the upper hub member 34 is formed into a flat strip shape extending in a direction orthogonal to the central axis Ax1. The upper hub member 34 can be made of a metal material, a synthetic resin material, or the like. The upper hub member 34 may be made of carbon fiber or carbon fiber-reinforced plastic, or may be made of a mixed material containing various materials. In addition, the upper hub member 34 may be made of the same material as a whole or may be partially made of a different material. The materials of the upper hub member 34 may be selected on the basis of necessary strength and rigidity, and cost, as appropriate.

The upper hub member 34 is provided with through-holes 34*f*, 34*g*, and 34*h*. The through-hole 34*f* axially passes through a center portion of the upper hub member 34. The through-hole 34*f* communicates with the through-hole 33*f* of the lower hub member 33. The through-hole 34*f* and the through-hole 33*f* constitute a through-hole 32*f*. The protruding portion 21*c* of the output shaft 21 of the motor 2 is inserted into the through-hole 32*f* (FIG. 3). In other words, the protruding portion 21*c* of the output shaft 21 of the motor 2 is fitted into the through-hole 32*f*. The through-hole 34*g* includes two through-holes 34*g*. The two through-holes 34*g* axially pass through the upper hub member 34. The through-hole 34*f* is provided between the two through-holes 34*g*. The through-hole 34*h* includes two through-holes 34*h*. The two through-holes 34*h* axially pass through the upper hub member 34. The through-holes 34*f* and 34*g* are provided between the two through-holes 34*h*. The plurality of connectors 35 is inserted into the two through-holes 34*h* (FIG. 3). The through-hole 32*f* is an example of opening. Note that the opening may be a recess opened in the second direction D2.

As illustrated in FIG. 3, each of the connectors 35 is a stepped male screw. A shaft portion of the connector 35 includes a large diameter portion 35*a* and a small diameter portion 35*b*. The large diameter portion 35*a* extends in the second direction D2 from the head of the connector 35 and is inserted into the through-hole 34*h* of the upper hub member 34 and the through-hole 31*c* of the blade 31. Crush ribs are provided in the through-hole 31*c* that is opposed to an outer peripheral surface of the large diameter portion 35*a*, and the crush ribs are crushed when the large diameter portion 35*a* is inserted into the through-hole 34*h* and the through-hole 31*c*. Therefore, the large diameter portion 35*a* is press-fitted into the through-hole 31*c*. Here, the through-hole 34*h* and the through-hole 31*c* have the same diameter. The small diameter portion 35*b* is a male threaded portion and has a diameter smaller than that of the large diameter portion 35*a*. The small diameter portion 35*b* extends from the large diameter portion 35*a* in the second direction D2 and is engaged with each of the female threaded portions 33*h* of the lower hub member 33.

Figure 12:
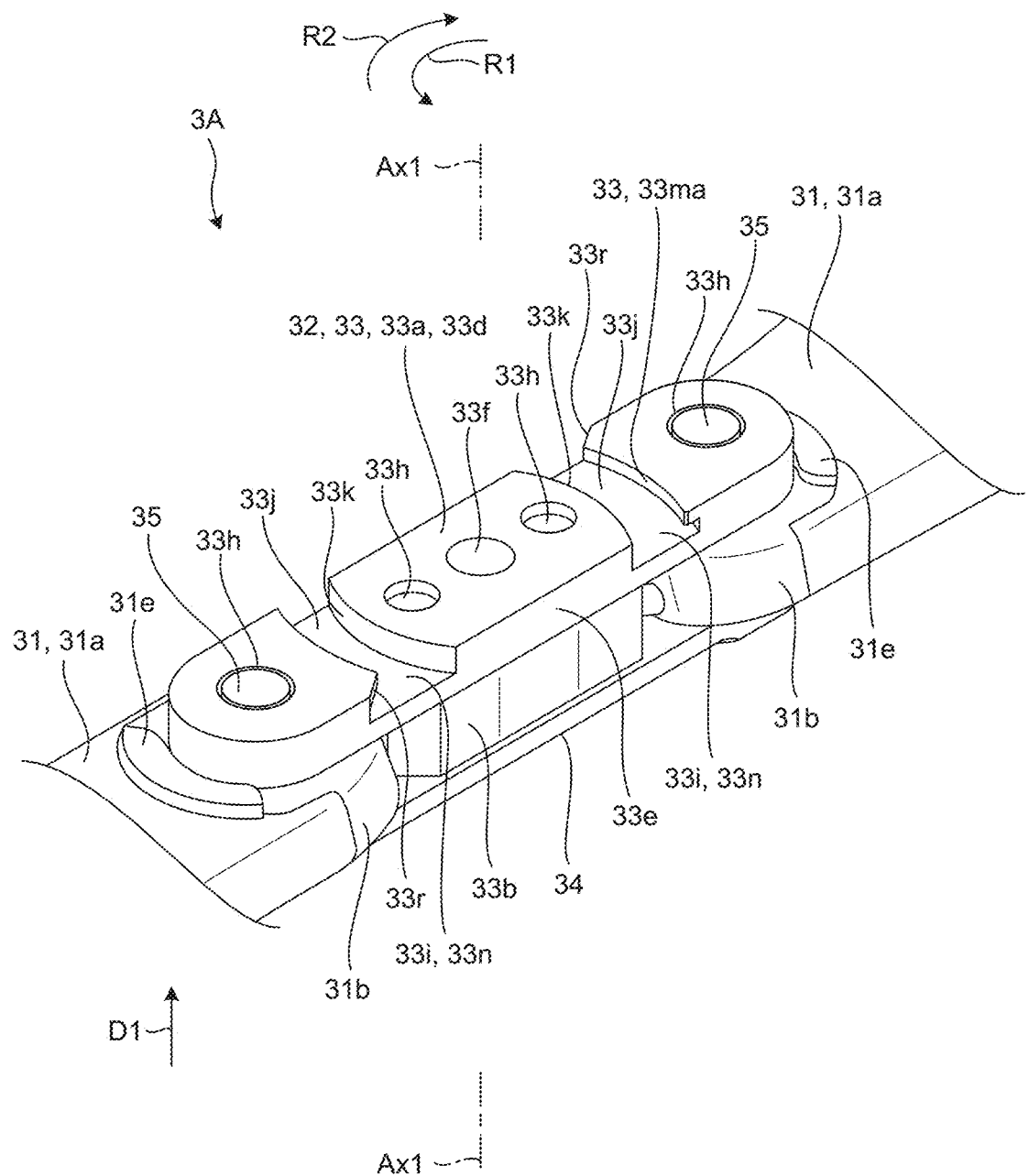
FIG. 12 is a perspective view of a center portion of another propeller according to the first embodiment, viewed obliquely from below the another propeller.

Here, the direction of rotation of the propeller 3 will be described. A rotation direction is set for the propeller 3. The rotation direction includes the rotation direction R1 and the rotation direction R2. In FIGS. 1 to 10, the rotation direction set for the propeller 3 is the rotation direction R1. FIG. 12 illustrates a propeller whose set rotation direction is the rotation direction R2. FIG. 12 is a perspective view of a center portion of another propeller 3A according to the first embodiment, viewed obliquely from below the another propeller 3A. As can be seen from FIGS. 11 and 12, the propeller 3 and the propeller 3A are different from each other in the position of each surface 33*r* of the attachment portion 33*a*. In other words, the surface 33*r* of the propeller 3 is connected to one end of the surface 33*ma* in the rotation direction R2, whereas the surface 33*r* of the propeller 3A is connected to an end of the surface 33*ma* in the rotation direction R1. Note that the attachment portion 33*a* of the propeller 3 and the attachment portion 33*a* of the propeller 3 have symmetrical shapes with respect to a predetermined plane. The reason why the surface 33*r* of the attachment portion 33*a* is made different between the propeller 3 and the propeller 3A is to suppress wrong assembly to the propeller attaching device 4. The surface 33*r* is an example of a mating portion on the propeller side.

[1-4. Propeller Attaching Device]

Figure 13:
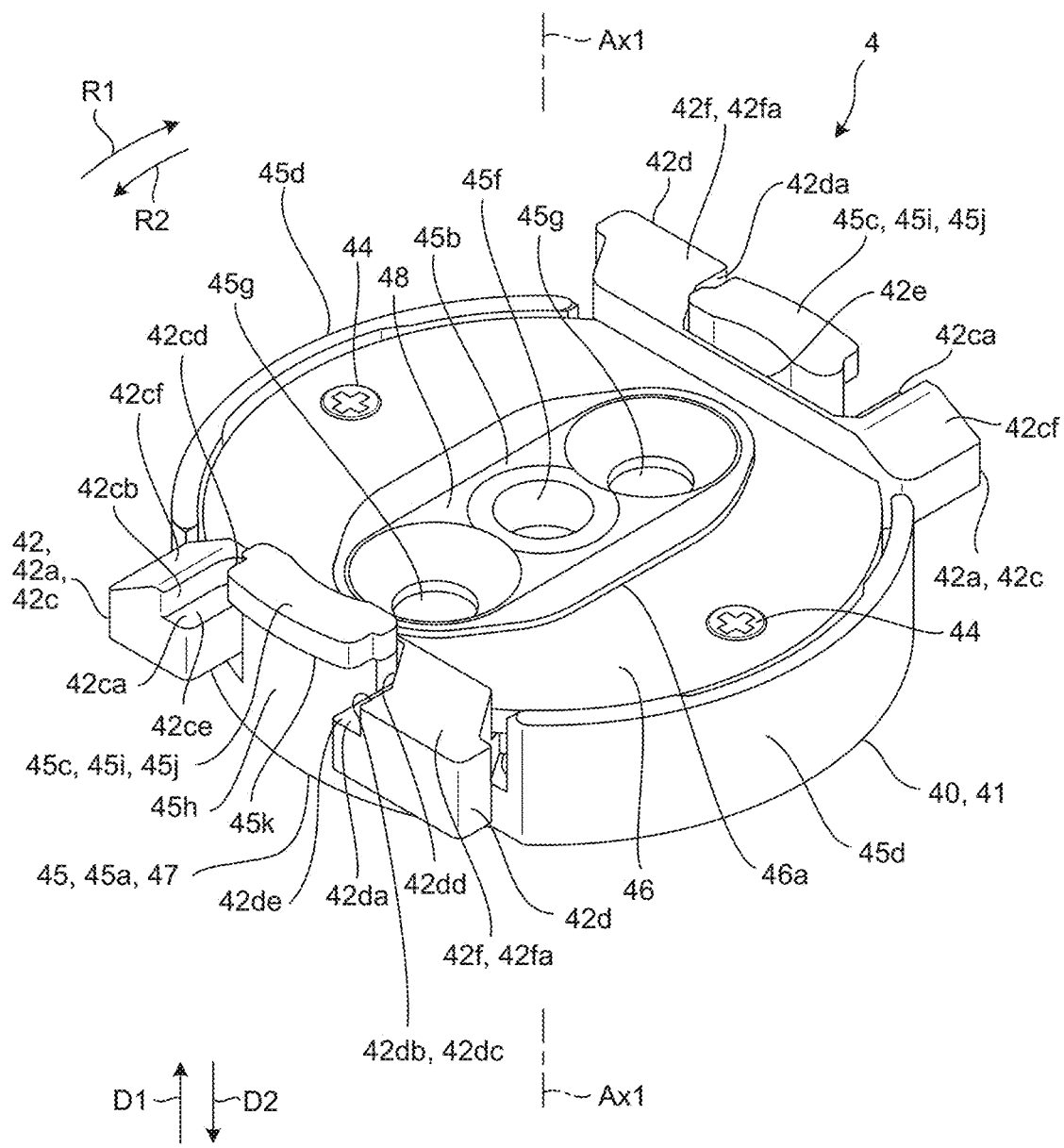
FIG. 13 is a perspective view of a propeller attaching device according to the first embodiment, viewed obliquely from above the propeller attaching device.
Figure 14:
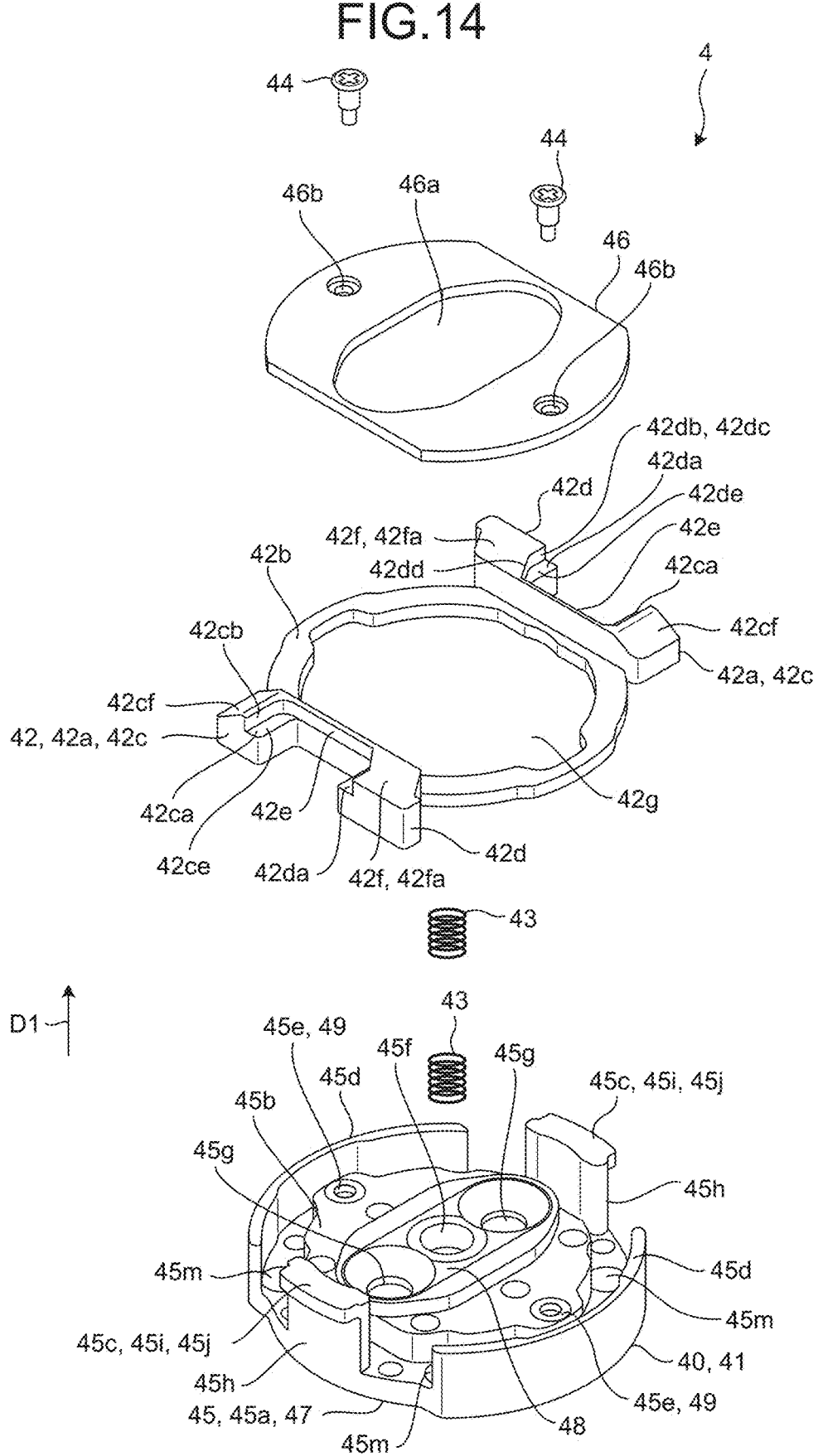
FIG. 14 is an exploded perspective view of the propeller attaching device according to the first embodiment, viewed obliquely from above the propeller attaching device.
Figure 15:
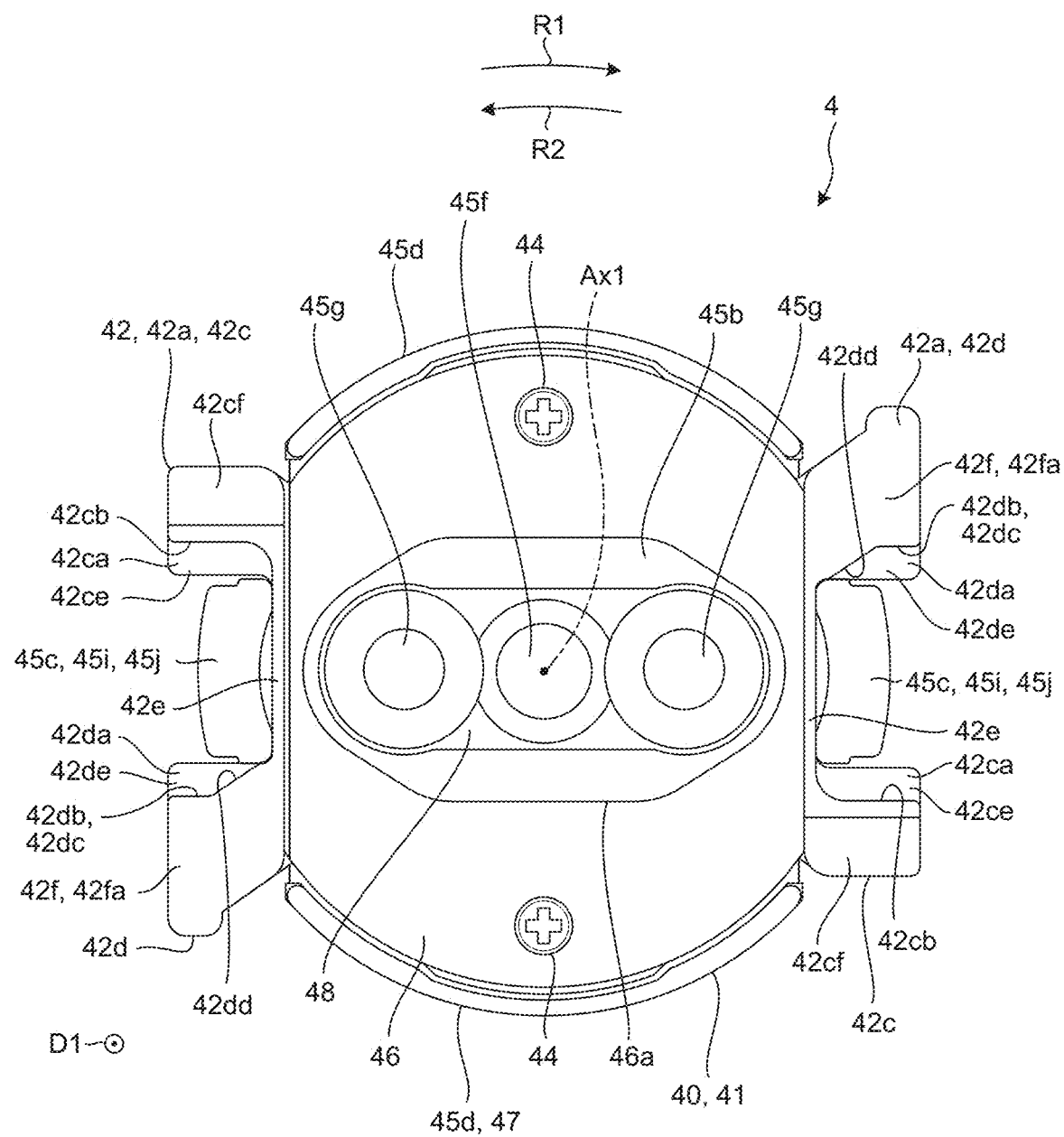
FIG. 15 is a plan view of the propeller attaching device according to the first embodiment.
Figure 16:
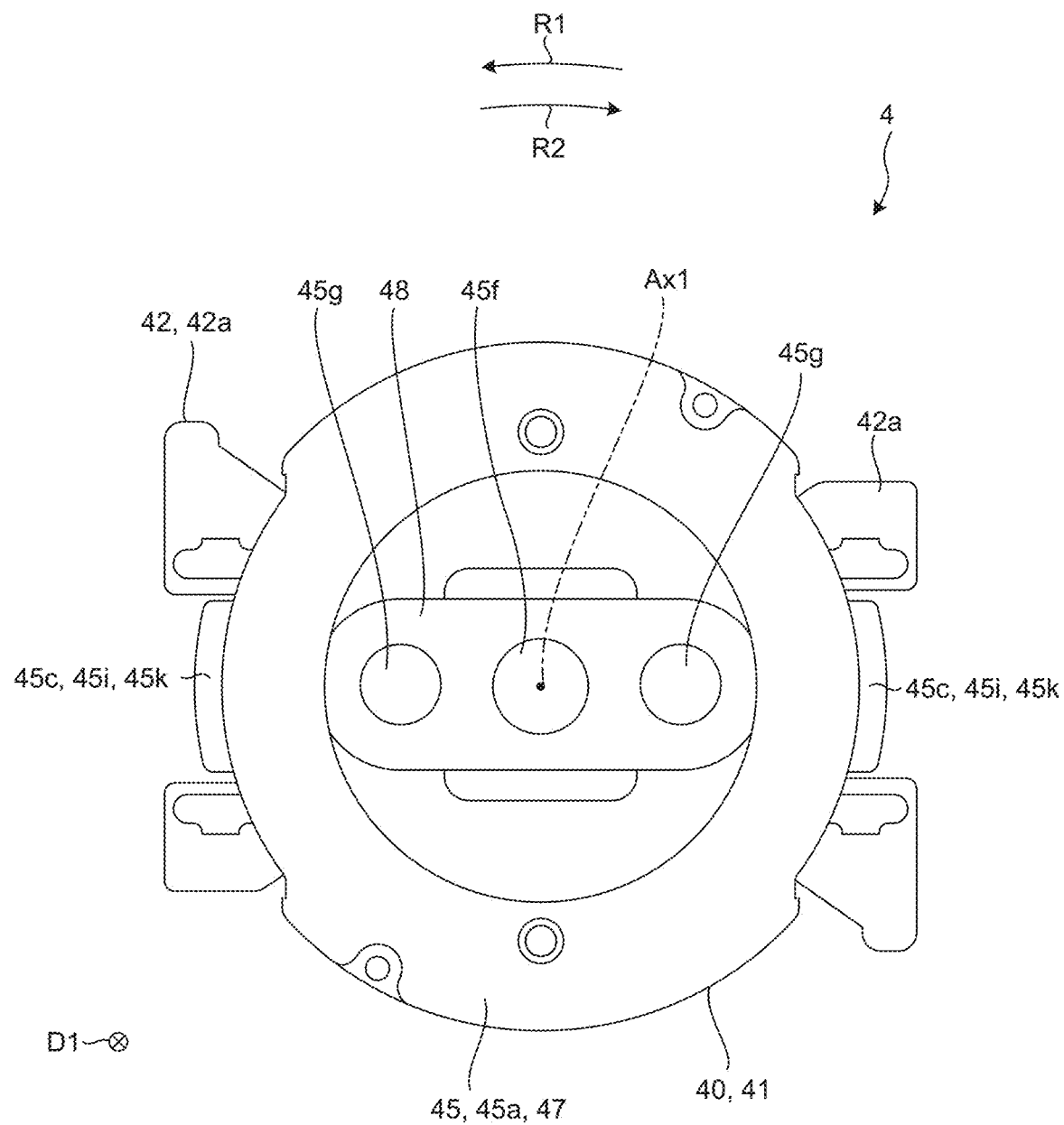
FIG. 16 is a bottom view of the propeller attaching device according to the first embodiment.

FIG. 13 is a perspective view of the propeller attaching device 4 according to the first embodiment, viewed obliquely from above the propeller attaching device 4. FIG. 14 is an exploded perspective view of the propeller attaching device 4 according to the first embodiment, viewed obliquely from above the propeller attaching device 4. FIG. 15 is a plan view of the propeller attaching device 4 according to the first embodiment. FIG. 16 is a bottom view of the propeller attaching device 4 according to the first embodiment.

As illustrated in FIGS. 13 to 16, the propeller attaching device 4 includes a coupler 40, a movable body 42, and a plurality of resilient bodies 43 (FIG. 14). As illustrated in FIG. 3, the propeller attaching device 4 is fixed to the motor 2 by connectors 5. Each of the connectors 5 is, for example, a male screw, and is engaged with each of the female threaded portions 22e of a protruding portion 22c of the motor 2. The coupler 40 is coupled to the output shaft 21 via the protruding portion 22c, and rotates integrally with the output shaft 21.

As illustrated in FIGS. 13 to 16, the coupler 40 includes a base 41 and a first receiving portion 45c. The base 41 is coupled to the output shaft 21. Circumferential rotation of the propeller 3 around the output shaft 21 relative to the base 41 makes it possible for the first receiving portion 45c to attach and detach the attachment portion 33a. The first receiving portion 45c receives the attachment portion 33a in the axial direction of the output shaft 21, thereby restricting the movement of the propeller 3 in the axial direction. In other words, the first receiving portion 45c receives an axial force from the propeller 3. The movable body 42 includes a second receiving portion 42a. The movable body 42 is supported by the coupler 40 so as to be movable in the axial direction between an attachment/detachment position (FIG. 2) and a restriction position (FIGS. 1 and 3), and rotates integrally with the coupler 40. The attachment/detachment position (FIG. 2) is a position where the movable body 42 allows attachment/detachment of the attachment portion 33a to/from the first receiving portion 45c. The restriction position is positioned in the first direction D1 relative to the attachment/detachment position. The restriction position is a position where the second receiving portion 42a circumferentially receives the attachment portion 33a attached to the first receiving portion 45c to restrict the circumferential rotation of the propeller 3 relative to the base 41. In other words, the second receiving portion 42a receives a circumferential force from the propeller 3. Each of the resilient bodies 43 presses the movable body 42 in the first direction D1 so that the movable body 42 rotates integrally with the coupler 40. The first receiving portion 45c and the second receiving portion 42a are also referred to as support portion.

The propeller attaching device 4 will be described in detail below.

The coupler 40 includes a combination of a plurality of members. Specifically, the coupler 40 includes a bayonet lower member 45 and a bayonet upper member 46. The term "bayonet" as used herein may be referred to as propeller attaching device. The bayonet lower member 45 includes a part of the base 41 and the first receiving portion 45c, and is coupled to the output shaft 21. The bayonet upper member 46 includes a part of the base 41 and is fixed to the bayonet lower member 45. A portion of the bayonet lower member 45 excluding the first receiving portion 45c and the whole of the bayonet upper member 46 constitute the base 41. The bayonet lower member 45 is an example of a first base member, and the bayonet upper member 46 is an example of a second base member.

The bayonet lower member 45 includes a bottom wall 45a, a protruding portion 45b, two outer walls 45d, and two female threaded portion 45e, as a portion constituting the base 41. The bayonet lower member 45 is a separate member from the motor 2.

The bottom wall 45a is formed into a substantially annular shape around the central axis Ax1. A plurality of recesses 45m are formed in the bottom wall 45a. In an example, four recesses 45m are formed. Each of the recesses 45m is open in the first direction D1.

The protruding portion 45b protrudes in the first direction D1 from a center portion of the bottom wall 45a. The protruding portion 45b is provided with through-holes 45f and 45g. The through-hole 45f axially passes through a center portion of the protruding portion 45b. The protruding portion 21c of the output shaft 21 of the motor 2 is inserted into the through-hole 45f (FIG. 3). The through-hole 45g includes two through-holes 45g. The two through-holes 45g axially pass through the protruding portion 45b. The through-hole 45f is provided between the two through-holes 45g. The connectors 5 (FIG. 3) are inserted into the through-holes 45g.

The two female threaded portions 45e are provided in the protruding portion 45b. The two female threaded portions 45e are arranged in a direction orthogonal to a direction in which the two through-holes 45g are arranged.

The bayonet lower member 45 can be made of a metal material, a synthetic resin material, or the like. Furthermore, the coupler 40 may be made of carbon fiber or carbon fiber-reinforced plastic, or may be made of a mixed material containing various materials. In addition, the bayonet lower member 45 may be made of the same material as a whole or may be partially made of a different material. For example, the bayonet lower member 45 includes a plurality of portions 47, 48, and 49 including different materials. The materials of the bayonet lower member 45 may be selected on the basis of necessary strength and rigidity, and cost, as appropriate.

As illustrated in FIGS. 14 and 15, the bayonet upper member 46 is formed into a flat plate shape. The bayonet upper member 46 is positioned between the upper ends of the two outer walls 45d of the bayonet lower member 45. Through-holes 46a and 46b are provided in the bayonet upper member 46. The through-hole 46a is provided in a center portion of the bayonet upper member 46. The through-hole 46a exposes the through-holes 45f and 45g of the bayonet lower member 45. The through-hole 46b includes two through-holes 46b. The through-hole 46a is provided between the two through-holes 46b. The bayonet upper member 46 is fixed to the bayonet lower member 45 by two connectors 44. Each of the connectors 44 is, for example, a male screw, and the connector 44 is engaged with each of the female threaded portions 45e of the bayonet lower member 45 while being inserted into each of the through-holes 46b of the bayonet upper member 46.

The bayonet upper member 46 can be made of a metal material, a synthetic resin material, or the like. Furthermore, the bayonet upper member 46 may be made of carbon fiber or carbon fiber-reinforced plastic, or may be made of a mixed material containing various materials. In addition, the bayonet upper member 46 may be made of the same material as a whole or may be partially made of a different material. The materials of the bayonet upper member 46 may be selected on the basis of necessary strength and rigidity, and cost, as appropriate.

As illustrated in FIGS. 13 and 14, a plurality of, specifically, two first receiving portions 45c are provided. Note that the number of the first receiving portions 45c may be one or three or more. The two first receiving portions 45c are positioned on the opposite sides relative to the output shaft 21. The two first receiving portions 45c extend from the bottom wall 45a of the bayonet lower member 45, in the first direction D1. The through-holes 45f and 45g are provided between the two first receiving portions 45c.

Each of the first receiving portions 45c includes an extension portion 45h and a protrusion 45i. The extension portion 45h extends from the bottom wall 45a in the axial direction, specifically, in the first direction D1. The protrusion 45i protrudes from the extension portion 45h to the outside of the output shaft 21 in the radial direction. The attachment portion 33a of the propeller 3 is attached to the protrusion 45i.

The first receiving portion 45c has a surface 45j and a surface 45k. The surface 45j is an end surface (upper surface) of the first receiving portion 45c, and faces in the first direction D1. The surface 45k is a lower surface of the protrusion 45i and faces in the second direction D2. As illustrated in FIG. 3, in a state where the attachment portion 33a of the propeller 3 is attached to the first receiving portions 45c, the surface 45j is opposed to the connection surface 33n of the attachment portion 33a in the axial direction, and the surface 45k is opposed to the surface 33mc of the attachment portion 33a in the axial direction. The surface 45j abuts on the connection surface 33n in the axial direction, thereby restricting the movement of the propeller 3 in the axial direction, specifically, in the second direction D2. The surface 45k abuts on the surface 33mc in the axial direction, thereby restricting the movement of the propeller 3 in the axial direction, specifically, in the first direction D1.

As illustrated in FIGS. 13 to 16, the movable body 42 includes a plurality of the second receiving portions 42a, specifically, two second receiving portions 42a, and a connection portion 42b that connects the two second receiving portions 42a. Note that the number of the second receiving portions 42a may be one or three or more.

The two second receiving portions 42a are positioned on the opposite sides relative to the output shaft 21. The two second receiving portions 42a are arranged in a direction in which the two first receiving portions 45c are arranged. Each of the second receiving portion 42a is provided for each of the first receiving portions 45c. Each second receiving portion 42a and the corresponding first receiving portion 45c constitute a support portion that supports each received portion 33i of the propeller 3. The two second receiving portions 42a are positioned outside the bayonet lower member 45 and the bayonet upper member 46.

Each of the second receiving portions 42a includes two claw portions 42c and 42d and a connection portion 42e that connects the two claw portions 42c and 42d. Furthermore, the second receiving portion 42a has a flat upper surface 42f. The upper surface 42f is provided at the two claw portions 42c and 42d and the connection portion 42e.

The claw portion 42c is positioned adjacent to the first receiving portion 45c, on a side of the first receiving portion 45c in the rotation direction R1. The claw portion 42c is provided with a recess 42ce. The recess 42ce is opened in the upper surface 42f and is opened in the rotation direction R2 and radially outward. The claw portion 42c has surfaces 42ca, 42cb, and 42cd as surfaces forming the recess 42ce. The surface 42ca is a flat surface facing in the first direction D1. The surface 42cb is a flat surface that extends in the first direction D1 from an end of the surface 42ca in the rotation direction R1 and extends in a direction intersecting the rotation directions R1 and R2. The surface 42cb faces toward the corresponding first receiving portion 45c. The surface 42cd is a curved surface connected to a radially inward end of the surface 42cb.

The claw portion 42d is positioned adjacent to the first receiving portion 45c, on a side of the first receiving portion 45c in the rotation direction R2. The claw portion 42d is provided with a recess 42de. The recess 4da is opened in the upper surface 42f and is opened in the rotation direction R1 and radially outward. The claw portion 42d has surfaces 42da, 42db, and 42dd as surfaces forming the recess 42de. The Surface 42da is a flat surface facing in the first direction D1. The surface 42db is a flat surface that extends in the first direction D1 from an end of the surface 42da in the rotation direction R2 and extends in a direction intersecting the rotation directions R1 and R2. The Surface 42db faces toward the corresponding first receiving portion 45c. Accordingly, the surface 42db and the surface 42cb are opposed to each other. The surface 42dd is an inclined surface connected to a radially inward end of the surface 42db and inclined relative to the surface 42db. Owing to the surface 42dd, a protrusion that protrudes toward the surface 42db is formed at the first receiving portion 45c. The surface 42dd is an example of the mating portion.

In a state where the attachment portion 33a of the propeller 3 is attached to the first receiving portion 45c, the surface 42cb and the surface 42db are circumferentially opposed to the peripheral surface 33e of the attachment portion 33a. The surface 42cb abuts on the peripheral surface 33e in the circumferential direction, thereby restricting the movement of the propeller 3 in the circumferential direction, specifically, in the rotation direction R1. The surface 42db abuts on the peripheral surface 33e in the circumferential direction, thereby restricting the movement of the propeller 3 in the circumferential direction, specifically, in the rotation direction R2.

Furthermore, the second receiving portion 42a has an inclined surface 42cf and an operation surface 42fa. The inclined surface 42cf is provided at the claw portion 42c and connected to the upper surface 42f. The inclined surface 42cf is circumferentially inclined in the first direction D1 while extending in the rotation direction R2.

The operation surface 42fa is provided at the claw portion 42d. The operation surface 42fa is constituted by an area of the claw portion 42d on the upper surface 42f. The operation surface 42fa extends in the circumferential direction and faces in the first direction D1. The operation surface 42fa is flat.

Furthermore, the second receiving portion 42a is axially guided by the extension portion 45h of the first receiving portion 45c. At this time, the second receiving portion 42a slides on the extension portion 45h.

As illustrated in FIG. 14, the connection portion 42b is positioned between the bayonet lower member 45 and the bayonet upper member 46. The connection portion 42b is provided with a through-hole 42g. The protruding portion 45b of the bayonet lower member 45 is inserted into the through-hole 42g.

The movable body 42 can be made of a metal material, a synthetic resin material, or the like. Furthermore, the movable body 42 may be made of carbon fiber or carbon fiber-reinforced plastic, or may be made of a mixed material containing various materials. In addition, the movable body 42 may be made of the same material as a whole or may be partially made of a different material.

Figure 17:
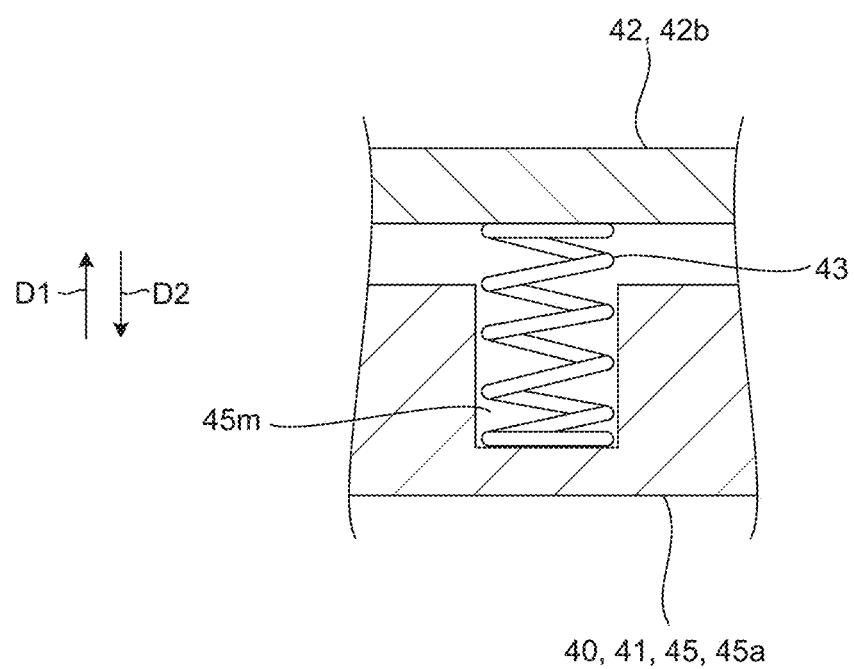
FIG. 17 is a cross-sectional view of a part of the propeller attaching device, including a resilient body, according to the first embodiment.

FIG. 17 is a cross-sectional view of a part of the propeller attaching device 4, including the resilient body 43, according to the first embodiment. As illustrated in FIGS. 14 and 17, the resilient body 43 is a coil spring. Note that the resilient body 43 may be, for example, a leaf spring or the like, as long as the spring generates a resilient force. The resilient body 43 is interposed between the bottom wall 45a of the bayonet lower member 45 and the connection portion 42b of the movable body 42. The resilient body 43 presses the movable body 42 in the first direction D1. The movable body 42 pressed in the first direction makes contact with the bayonet upper member 46 and is restricted from moving in the first direction D1. Therefore, the second receiving portion 42a is held at the restriction position.

The resilient body 43 includes two resilient bodies 43. The two resilient bodies 43 are stored in two diagonally positioned recesses 45m of the four recesses 45m in the bottom wall 45a. Specifically, the two resilient bodies 43 are stored in two recesses 45m in the vicinity of two operation surfaces 42fa, from among the four recesses 45m. Note that the number of resilient bodies 43 is not limited to two. For example, four resilient bodies 43 may be provided and stored in the recesses 45m. Furthermore, the number of resilient bodies 43 may be one or five or more. The resilient force of each of the resilient bodies 43 can be set so as to hold each second receiving portion 42a at the restriction position, for example, even when an impact of a predetermined magnitude is applied to the propeller attaching device 4.

For example, when the attachment portion 33a is attached to the first receiving portions 45c, pressing the inclined surfaces 42cf by the propeller 3 rotating in the rotation direction R2 moves the movable body 42 having the above configuration, from the restriction position to the attachment/detachment position against the resilient forces of the resilient bodies 43. At this time, the resilient bodies 43 are compressed. When the inclined surfaces 42cf are released from the pressing by the propeller 3, the movable body 42 is moved from the attachment/detachment position to the restriction position by the resilient forces of the resilient bodies 43. The rotation direction R2 is an example of one side in the circumferential direction.

Figure 18:
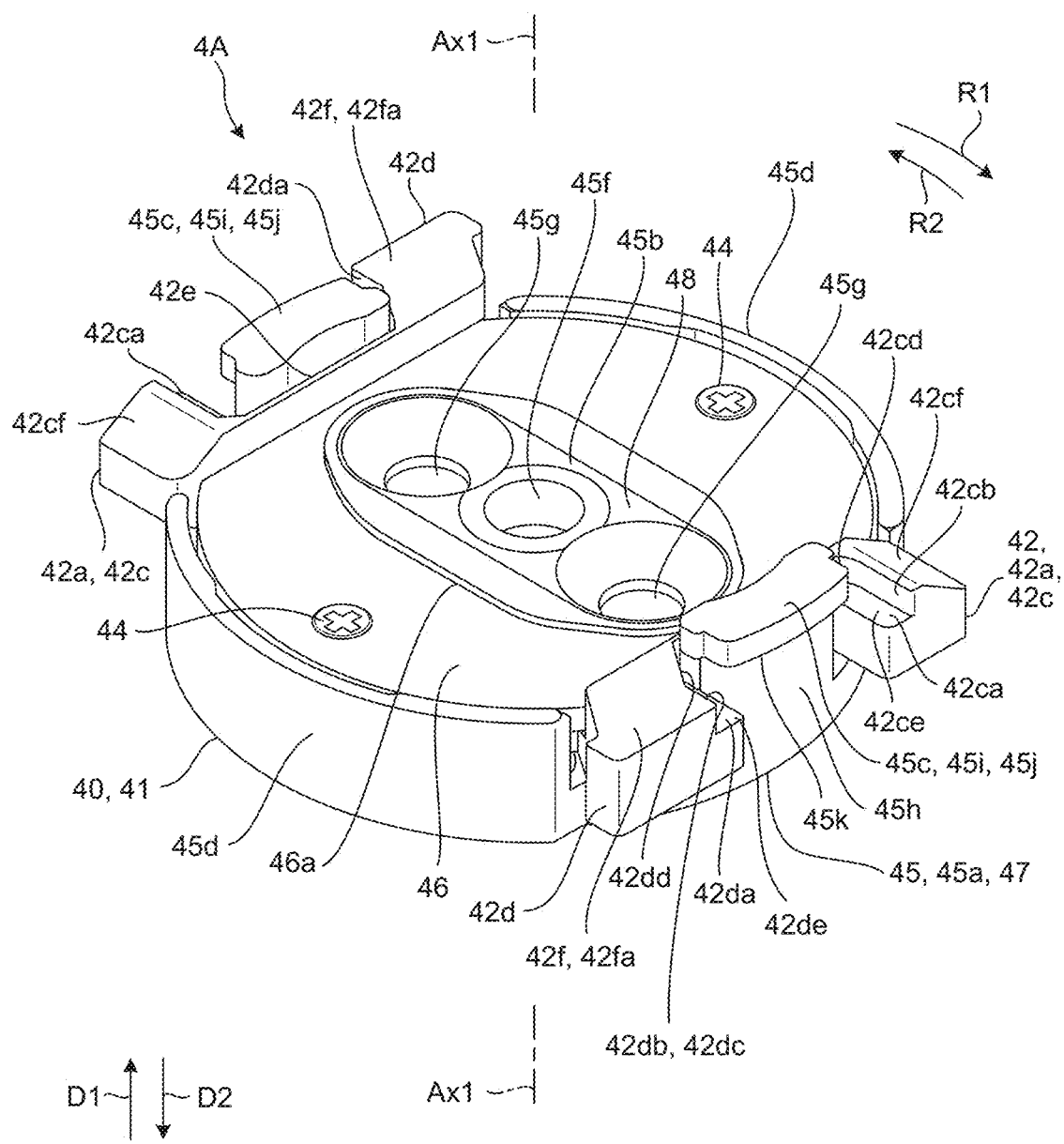
FIG. 18 is a perspective view of another propeller attaching device according to the first embodiment, viewed obliquely from above the another propeller attaching device.

Here, the type of the propeller attaching device 4 will be described. The propeller attaching device 4 illustrated in FIGS. 13 to 17 is used for the propeller 3 whose rotation direction is set to the rotation direction R1 illustrated in FIGS. 1 to 10. FIG. 18 illustrates a propeller attaching device 4A for the propeller 3A (FIG. 12) whose rotation direction is set to the rotation direction R2. FIG. 18 is a perspective view of the another propeller attaching device 4A according to the first embodiment, viewed obliquely from above the another propeller attaching device 4A. As can be seen from FIGS. 13 and 18, the propeller attaching device 4 and the propeller attaching device 4A are different from each other in at least the positions of the inclined surface 42cf and the operation surface 42fa. Furthermore, the lower hub members 33 and the upper hub members 34 are the same in shape between the propeller attaching device 4 and the propeller attaching device 4A. Note that the propeller attaching device 4 and the propeller attaching device 4A have symmetrical shapes with respect to a predetermined plane. The surfaces 42dd of the propeller attaching device 4 are configured to be combined with the surfaces 33r of the propeller 3, but are not configured to be combined with the surfaces 33r of the propeller 3A. On the other hand, the surfaces 42dd of the propeller attaching device 4A are configured to be combined with the surfaces 33r of the propeller 3A, but are not configured to be combined with the surfaces 33r of the propeller 3.

[1-5. Operation]

In the propeller propulsion system 1, when the output shaft 21 of the motor 2 rotates, the propeller attaching device 4 rotates integrally with the output shaft 21. At this time, the first receiving portions 45c of the propeller attaching device 4 axially receives the attachment portion 33a of the propeller 3, thereby restricting the movement of the propeller 3 in the axial direction. Furthermore, the second receiving portions 42a of the propeller attaching device 4 circumferentially receives the attachment portion 33a attached to the first receiving portions 45c, thereby restricting the circumferential rotation of the propeller 3 relative to the base 41. Therefore, the propeller 3 rotates integrally with the output shaft 21 and the propeller attaching device 4.

[1-6. Propeller Attaching Method and Propeller Removing Method]

Figure 19:
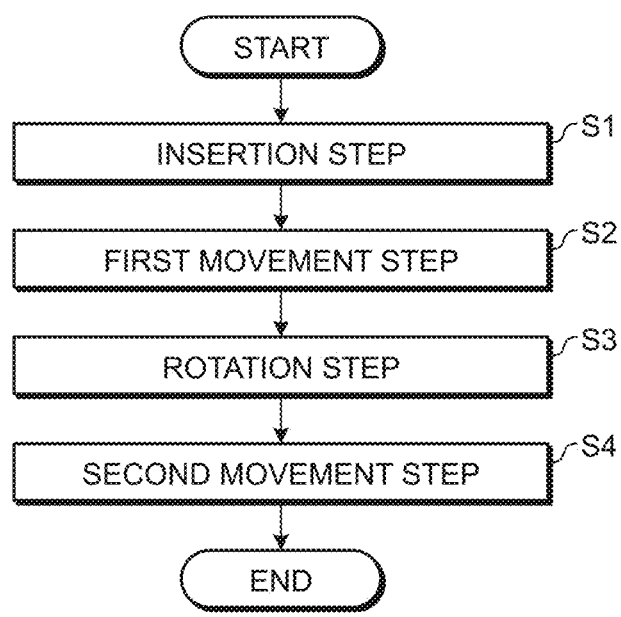
FIG. 19 is a flowchart illustrating a process of attaching the propeller according to the first embodiment.
Figure 20:
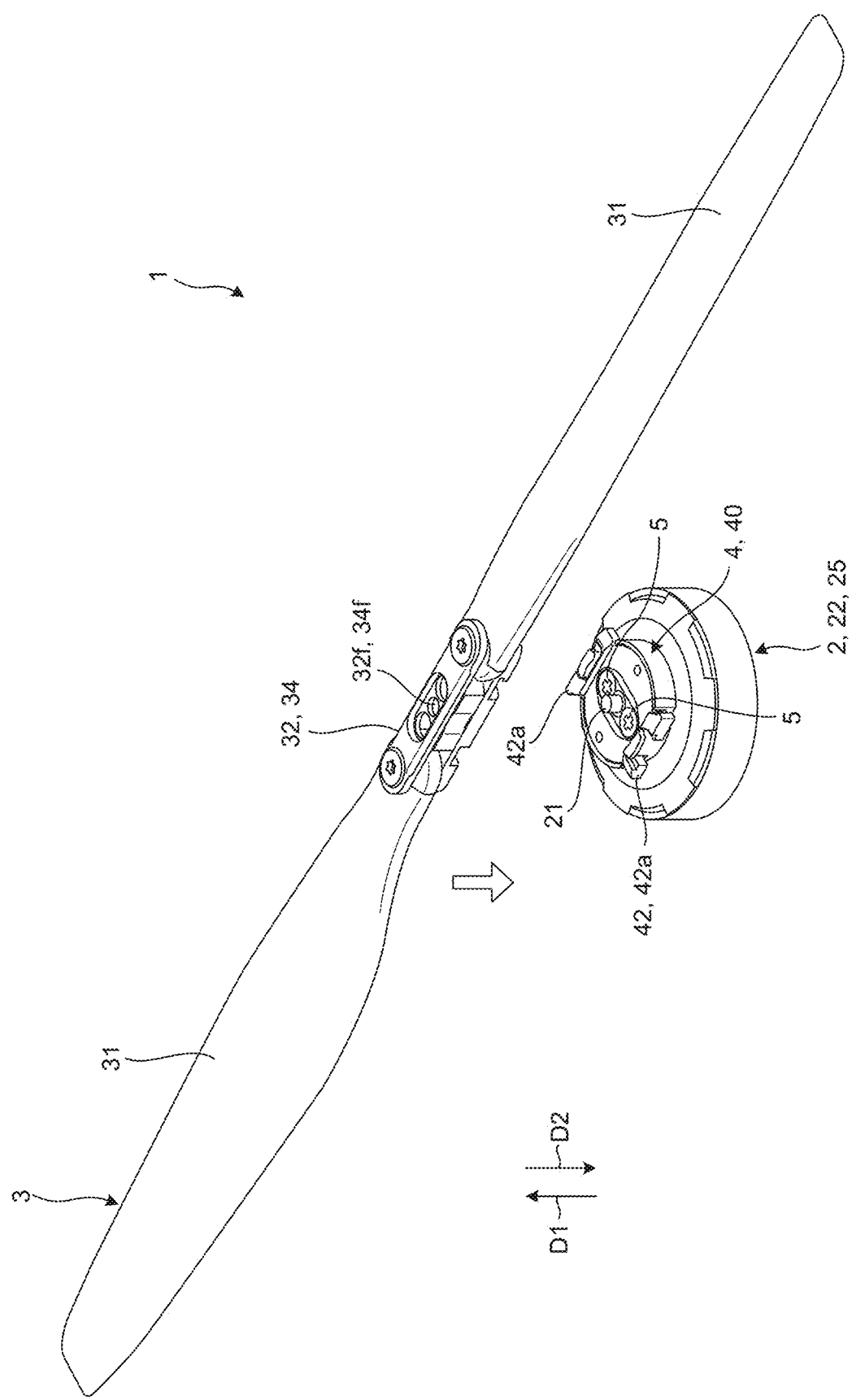
FIG. 20 is a diagram illustrating the process of attaching the propeller according to the first embodiment.
Figure 21:
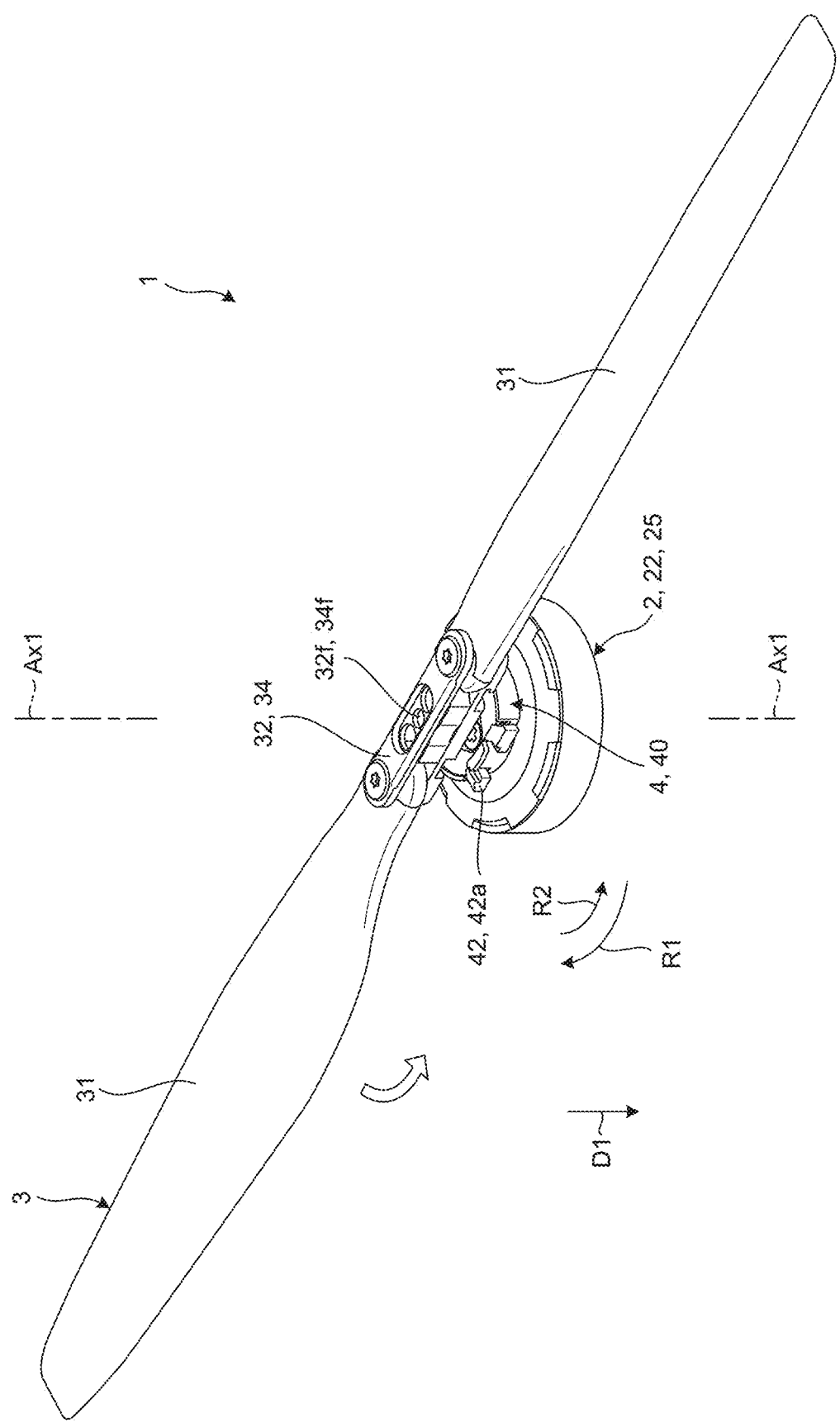
FIG. 21 is a diagram illustrating the process of attaching the propeller according to the first embodiment.

FIG. 19 is a flowchart illustrating a process of attaching the propeller 3 according to the first embodiment. FIGS. 20 and 21 are diagrams illustrating the process of attaching the propeller 3 according to the first embodiment. FIG. 21 is a view illustrating the following process of the process in FIG. 20. In the following propeller attaching method, an example of a worker will be described as a working subject, but the working subject may be an assembly apparatus such as a robot.

As illustrated in FIG. 19, the worker performs an insertion step (S1). Specifically, as illustrated in FIGS. 20 and 21, the worker inserts the protruding portion 21c of the propeller 3 protruding from the through-hole 45f of the base 41 of the propeller attaching device 4 assembled to the motor 2, into the through-hole 32f.

Next, as illustrated in FIG. 19, the worker performs a first movement step (S2). Specifically, the worker moves the second receiving portions 42a from the restriction position to the attachment/detachment position against the resilient forces of the resilient bodies 43. At this time, the worker rotates the propeller 3 with the output shaft 21 inserted into the through-hole 32f, in a circumferential direction (e.g., the rotation direction R2) so that the propeller 3 presses the inclined surfaces 42cf in the second direction D2, and moves the second receiving portion 42a from the restriction position to the attachment/detachment position. Note that in another example, the worker may press the operation surfaces 42fa in the second direction D2 by finger to move the second receiving portion 42a from the restriction position to the attachment/detachment position.

Next, the worker performs a rotation step (S3). Specifically, following the first movement step, the worker rotates the propeller 3 in the circumferential direction (e.g., the rotation direction R2) to attach the attachment portion 33a to each second receiving portion 42a. When the attachment portion 33a is attached to the second receiving portions 42a, a second movement step is performed by the resilient bodies 43 (S4). Specifically, the resilient bodies 43 move the second receiving portions 42a from the attachment/detachment position to the restriction position by the resilient force. Therefore, the propeller 3 is attached to the output shaft 21 of the motor 2 via the propeller attaching device 4 (FIG. 1).

For example, when removing the propeller 3 from the output shaft 21, the operator presses the operation surfaces 42fa in the second direction D2 by finger to move the second receiving portions 42a from the restriction position to the attachment/detachment position. At this time, the resilient bodies 43 are compressed and deformed. Next, the worker rotates the propeller 3 in a circumferential direction to detach the attachment portion 33a from the first receiving portions 45c. Therefore, the movable body 42 moves in the first direction D1 by the resilient forces of the resilient bodies 43, and the second receiving portions 42a move from the restriction position to the attachment/detachment position. Next, the operator moves the propeller 3 in the first direction D1 to remove the propeller 3 from the output shaft 21.

[1-7. Effects]

As described above, the propeller attaching device 4 of the present embodiment includes the coupler 40, the movable body 42, and the resilient bodies 43. The coupler 40 rotates integrally with the output shaft 21. The coupler 40 includes the base 41 and the first receiving portion 45c. The base 41 is provided with the through-hole 45f into which the protruding portion 21c of the output shaft 21 including the one end 21a of the output shaft 21 of the motor 2 is inserted, and thus, the base 41 is coupled to the output shaft 21. Circumferential rotation of the propeller 3 around the output shaft 21 relative to the base 41 makes it possible for the first receiving portion 45c to attach and detach the attachment portion 33a. The first receiving portion 45c receives the attachment portion 33a in the axial direction of the output shaft 21, thereby restricting the movement of the propeller 3 in the axial direction. The movable body 42 includes the second receiving portion 42a. The movable body 42 is supported by the coupler 40 so as to be movable in the axial direction between the attachment/detachment position and the restriction position, and rotates integrally with the coupler 40. The attachment/detachment position is a position where the movable body 42 allows attachment/detachment of the attachment portion 33a to/from the first receiving portion 45c. The restriction position is positioned in the first direction D1 relative to the attachment/detachment position, the first direction D1 extending from the other end 21b of the output shaft 21 to the one end 21a in the axial direction of the output shaft 21. The restriction position is a position where the second receiving portion 42a circumferentially receives the attachment portion 33a attached to the first receiving portion 45c to restrict the circumferential rotation of the propeller 3 relative to the base 41. Each of the resilient bodies 43 presses the movable body 42 in the first direction D1 so that the movable body 42 rotates integrally with the coupler 40. The propeller 3 includes the attachment portion 33a. The propeller 3 is provided with the through-hole 32f (opening) into which the protruding portion 21c of the output shaft 21 protruding from the through-hole 45f is inserted.

As can be seen from the above description, in the propeller attaching device 4 of the present embodiment, the support portion that supports the propeller 3 is separated into two receiving portions (the first receiving portion 45c, and the second receiving portion 42a). The support portion is separated into the two receiving portions because of the following reason. In other words, in a case where the support portion has a configuration not divided into two, specifically, in a case where the support portion has a configuration in which the movements of the propeller in the circumferential direction and the axial direction are restricted by one receiving portion (support portion) constituted by a resilient member, the support portion is easily affected by a strong wind or the like. Specifically, in the configuration in which the movements of the propeller in the circumferential direction and the axial direction are restricted by one receiving portion, when a load in the axial direction is applied to the propeller due to the strong wind or the like, specifically, a load in a direction in which the propeller is removed is applied to the receiving portion, the receiving portion is easily deformed in the direction in which the propeller is removed from the receiving portion. Meanwhile, in the present embodiment, as described above, the support portion that supports the propeller 3 is separated into two receiving portions (the first receiving portion 45c and the second receiving portion 42a). Therefore, even when the load in the axial direction is applied to the propeller 3 due to the strong wind, the load is received by the first receiving portion 45c, thus, suppressing the load on the resilient body 43. Therefore, the attachment reliability of the propeller 3 can be improved. Furthermore, the protruding portion 21c of the output shaft 21 is inserted into the through-hole 32f of the propeller 3. Therefore, contact between the peripheral surface forming the through-hole 32f of the propeller 3 and the protruding portion 21c of the output shaft 21 enables accurate positioning of the propeller 3 to the output shaft 21. In other words, eccentricity of the propeller 3 with respect to the output shaft 21 can be suppressed. Thus, generation of vibration of the propeller 3 can be suppressed.

Furthermore, in the present embodiment, the movable body 42 has the inclined surface 42cf circumferentially inclined in the first direction D1 while extending to one side in the circumferential direction (e.g., the rotation direction R2). When the attachment portion 33a is attached to the first receiving portion 45c, pressing the inclined surface 42cf by the propeller 3 rotating in the second direction D2 moves the movable body 42, from the restriction position to the attachment/detachment position against the resilient force of the resilient body 43. When the inclined surfaces 42cf are released from the pressing by the propeller 3, the movable body 42 is moved from the attachment/detachment position to the restriction position by the resilient forces of the resilient bodies 43.

According to such a configuration, rotating the propeller 3 in the second direction D2 and pressing the inclined surface 42cf by the propeller 3 moves the second receiving portion 42a from the restriction position to the attachment/detachment position, thus, enabling attachment of the attachment portion 33a of the propeller 3 to the first receiving portion 45c. Therefore, the attachment portion 33a of the propeller 3 can be readily attached to the first receiving portion 45c.

Furthermore, in the present embodiment, the inclined surface 42cf is provided at the second receiving portion 42a.

According to such a configuration, the configuration of the propeller attaching device 4 can be readily simplified as compared with a configuration in which the inclined surface 42cf is provided separately from the second receiving portion 42a.

Furthermore, in the present embodiment, the movable body 42 has the operation surface 42fa being flat, extending in the circumferential direction, and facing in the first direction D1.

According to such a configuration, pressing the operation surface 42fa in a direction opposite to the first direction D1 moves the second receiving portion 42a from the restriction position to the attachment/detachment position.

Furthermore, in the present embodiment, the operation surface 42fa is provided at the second receiving portion 42a.

According to such a configuration, the configuration of the propeller attaching device 4 can be readily simplified as compared with a configuration in which the operation surface 42fa is provided separately from the second receiving portion 42a.

Furthermore, in the present embodiment, the propeller attaching device 4 has the surface 42dd (mating portion). The rotation direction (rotation direction R1 or R2) is set to the propeller 3. The attachment portion 33a has the surface 33r (mating portion on the propeller side) having a shape according to the rotation direction. The surface 42dd is configured to be combined with the surface 33r of the propeller 3 having a defined rotation direction. The surface 42dd is not configured to be combined with the surface 33r of the propeller 3A having the rotation direction opposite to the defined rotation direction.

According to such a configuration, it is possible to suppress wrong attachment of the propeller 3A having the rotation direction opposite to the defined rotation direction to the propeller attaching device 4.

Furthermore, in the present embodiment, the surface 42dd is provided at the second receiving portion 42a.

According to such a configuration, the configuration of the propeller attaching device 4 can be readily simplified as compared with a configuration in which the surface 42dd is provided separately from the second receiving portion 42a.

Furthermore, in the present embodiment, the propeller attaching device 4 includes the bayonet lower member 45 (first base member) and the bayonet upper member 46 (second base member). The bayonet lower member 45 includes a part of the base 41 and the first receiving portion 45c, and is coupled to the output shaft 21. The bayonet upper member 46 includes a part of the base 41 and is fixed to the bayonet lower member 45. A part (connection portion 42b) of the movable body 42 is positioned between the bayonet lower member 45 and the bayonet upper member 46. The second receiving portion 42a is positioned outside the bayonet lower member 45 and the bayonet upper member 46. The resilient body 43 is interposed between the bayonet lower member 45 and a part (the connection portion 42b) of the movable body 42.

According to such a configuration, the resilient body 43 is readily protected by the bayonet lower member 45 and the bayonet upper member 46.

Furthermore, in the present embodiment, the bayonet lower member 45 is the separate member from the motor 2.

According to such a configuration, the propeller attaching device 4 can be configured as a separate component from the motor 2, requiring no replacement of the propeller attaching device 4 upon replacement of the motor 2.

Furthermore, in the present embodiment, one of the attachment portion 33a and the first receiving portion 45c (e.g., the first receiving portion 45c) has the protrusion 45i, and the other of the attachment portion 33a and the first receiving portion 45c (e.g., the attachment portion 33a) is provided with the groove portion 33jc into which the protrusion 45i is inserted and which extends circumferentially. Note that the attachment portion 33a may have the protrusion, and the first receiving portion 45c may be provided with the groove portion.

According to such a configuration, fitting the protrusion 45i into the groove portion 33jc enables attachment of the attachment portion 33a to the first receiving portion 45c.

Furthermore, in the present embodiment, the first receiving portion 45c has the protrusion 45i. The attachment portion 33a is provided with the groove portion 33jc.

According to such a configuration, the strength and rigidity of the first receiving portion 45c can be readily increased as compared with a configuration in which the groove portion 33jc is provided in the first receiving portion 45c.

Furthermore, in the present embodiment, the first receiving portion 45c includes the extension portion 45h and the protrusion 45i. The extension portion 45h extends from the base 41 in the axial direction. The protrusion 45i protrudes from the extension portion 45h to the outside of the output shaft 21 in the radial direction, and the attachment portion 33a is attached to the protrusion 45i.

According to such a configuration, the attachment portion 33a can be supported by the protrusion 45i.

Furthermore, in the present embodiment, the extension portion 45h extends from the base 41 in the first direction D1 and guides the second receiving portion 42a in the axial direction.

According to such a configuration, the extension portion 45h can guide the second receiving portion 42a in the axial direction.

Furthermore, in the present embodiment, a plurality of the first receiving portions 45c and a plurality of the second receiving portions 42a are provided. The movable body 42 includes a plurality of the second receiving portions 42a and the connection portion 42b that connects the plurality of the second receiving portions 42a.

According to such a configuration, a force applied to the propeller attaching device 4 from the propeller 3 can be readily dispersed, as compared with a configuration that has one first receiving portion 45c and one second receiving portion 42a.

Furthermore, In the present embodiment, the first receiving portion 45c includes two first receiving portions 45c and the second receiving portion 42a includes two second receiving portions 42a. The two first receiving portions 45c are positioned on the opposite sides relative to the output shaft 21. The two second receiving portions 42a are positioned on the opposite sides relative to the output shaft 21.

According to such a configuration, a force applied to the propeller attaching device 4 from the propeller 3 can be received by the portions of the propeller attaching device 4 on the opposite sides relative to the output shaft 21.

Furthermore, in the propeller attaching device method of the present embodiment, the propeller 3 is mounted to the motor 2 by using the propeller attaching device 4. The propeller attaching device method includes the insertion step, the first movement step, the rotation step, and the second movement step. In the insertion step, the protruding portion 21c of the propeller 3 protruding from the through-hole 45f of the base 41 is inserted into the through-hole 32f. In the first movement step, each second receiving portion 42a is moved from the restriction position to the attachment/detachment position against the resilient force of the resilient body 43. In the rotation step, the propeller 3 with the output shaft 21 inserted into the through-hole 32f is rotated in the circumferential direction to attach the attachment portion 33a to the second receiving portion 42a. In the second movement step, the resilient body 43 moves the second receiving portion 42a from the attachment/detachment position to the restriction position.

Owing to the propeller attaching device method as described above, even when the load in the axial direction is applied to the propeller 3 attached to the output shaft 21 due to the strong wind, the load is received by the first receiving portion 45c, thus, suppressing the load on the resilient body 43. Therefore, the attachment reliability of the propeller 3 can be improved.

[1-8. Reference Example]

Figure 22:
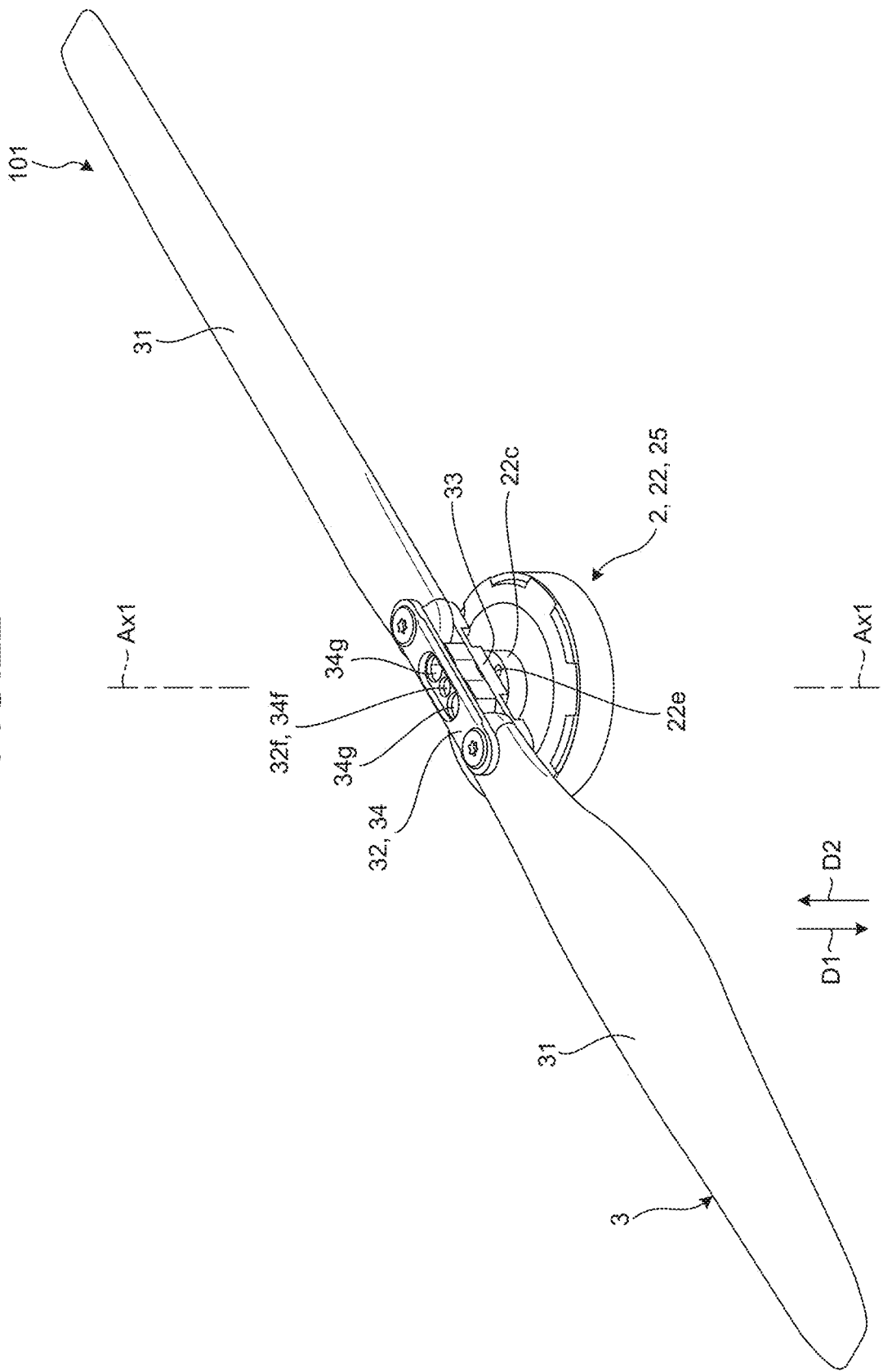
FIG. 22 is a perspective view of a propeller propulsion system as a reference example according to the first embodiment, viewed obliquely from above the propeller propulsion system.

FIG. 22 is a perspective view of a propeller propulsion system 101 as a reference example according to the first embodiment, viewed obliquely from above the propeller propulsion system 101.

As illustrated in FIG. 22, the propeller propulsion system 101 is not provided with the propeller attaching device 4, and the propeller 3 is directly attached to the rotor 22 of the motor 2 by the connectors (not illustrated). The connectors being inserted into the through-holes 33g and 34g of the propeller 3 are engaged with the female threaded portions 22e of the motor 2. According to such a configuration, the propeller propulsion system 101 can be reduced in weight.

2. Second Embodiment

[2-1. Configuration of Propeller Propulsion System According to Second Embodiment]

Figure 23:
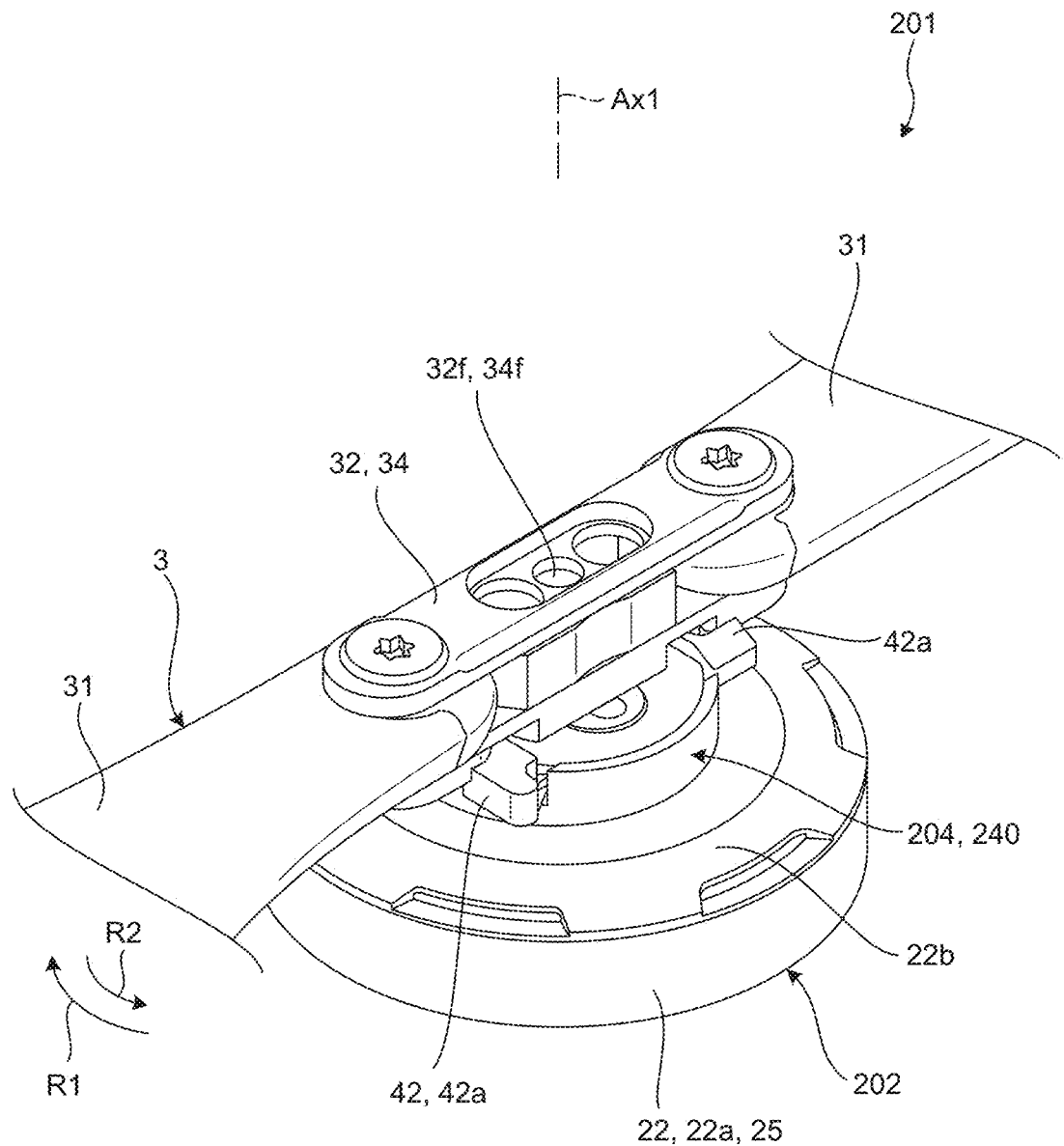
FIG. 23 is a perspective view of a part of a propeller propulsion system according to a second embodiment of the present disclosure, viewed obliquely from above the propeller propulsion system.

FIG. 23 is a perspective view of a part of a propeller propulsion system 201 according to a second embodiment of the present disclosure, viewed obliquely from above the propeller propulsion system 201.

The propeller propulsion system 201 illustrated in FIG. 23 has a similar configuration to the propeller propulsion system 1. However, the propeller propulsion system 201 includes a motor 202 and a propeller attaching device 204 instead of the motor 2 and the propeller attaching device 4.

[2-2. Motor and Propeller Attaching Device]

Figure 24:
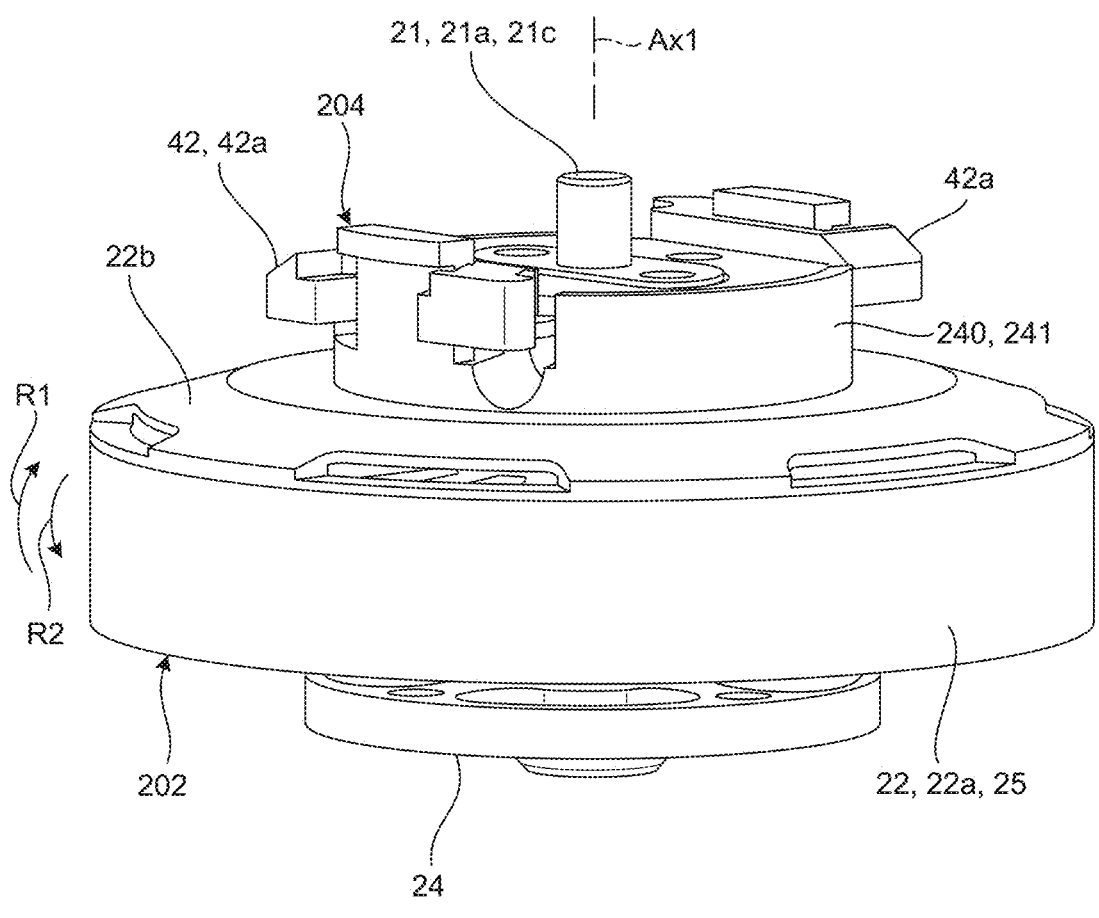
FIG. 24 is a perspective view of a motor and a propeller attaching device according to the second embodiment, viewed obliquely from above the motor and the propeller attaching device.
Figure 25:
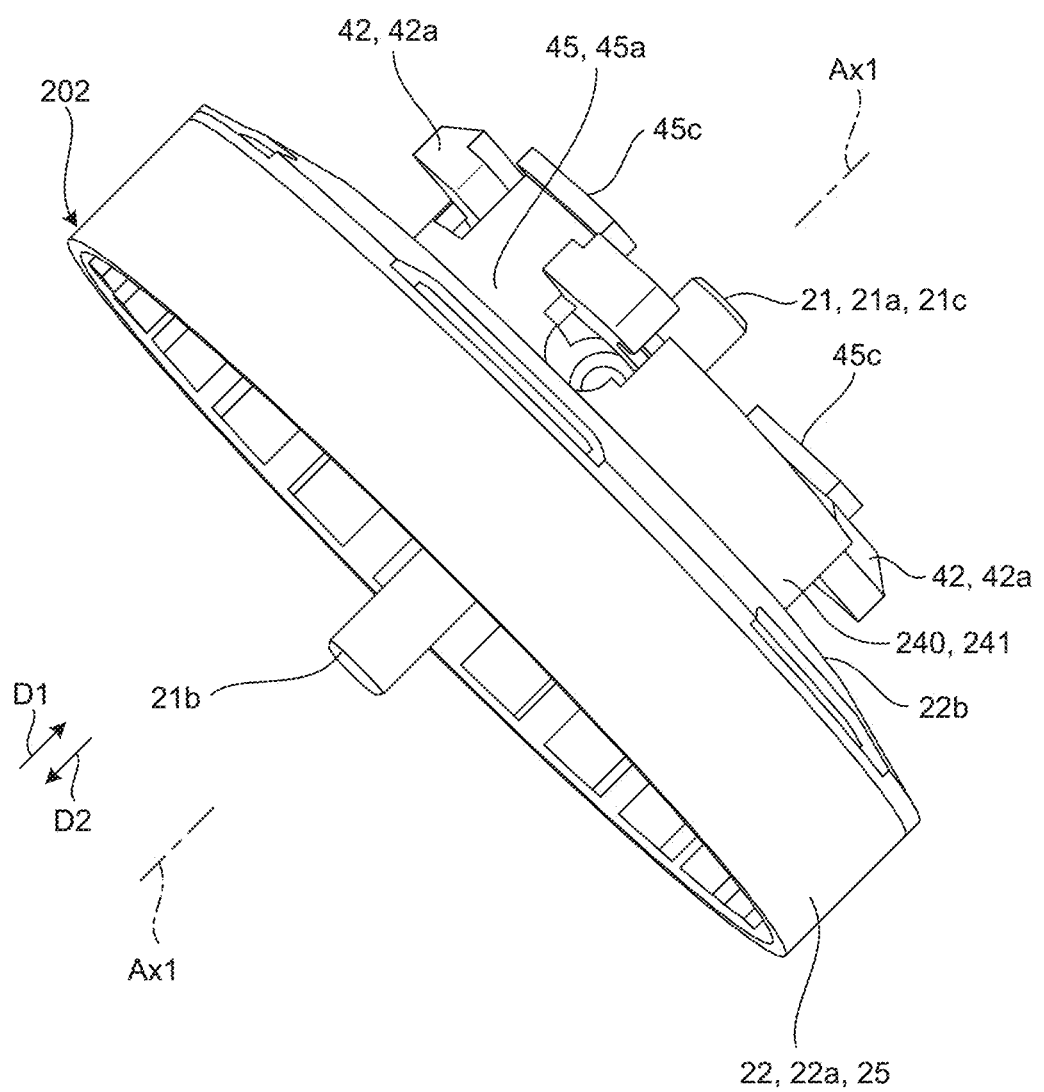
FIG. 25 is a perspective view of the motor and the propeller attaching device according to the second embodiment, viewed obliquely from below the motor and the propeller attaching device.
Figure 26:
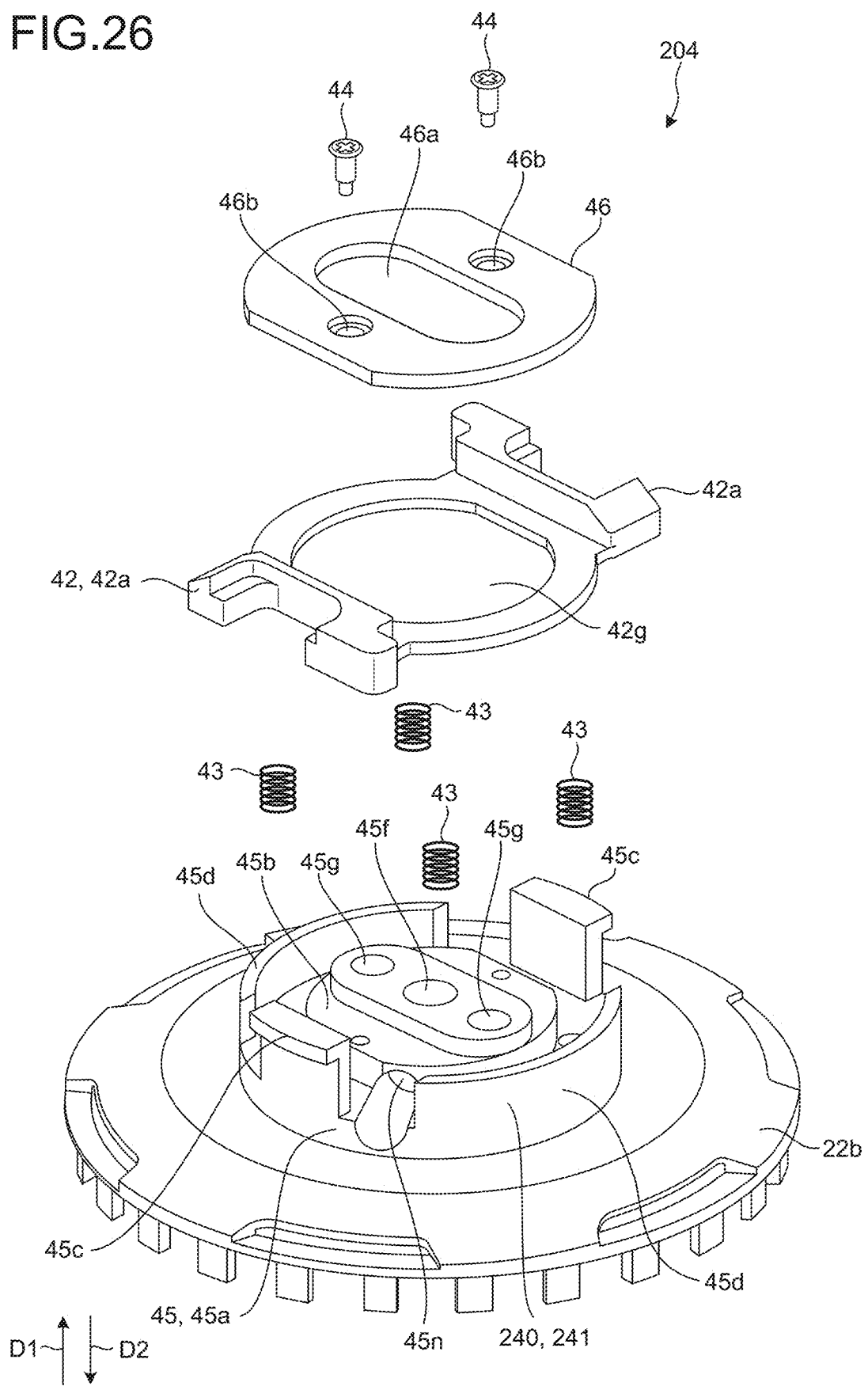
FIG. 26 is an exploded perspective view of the motor and the propeller attaching device according to the second embodiment, viewed obliquely from above the motor and the propeller attaching device.
Figure 27:
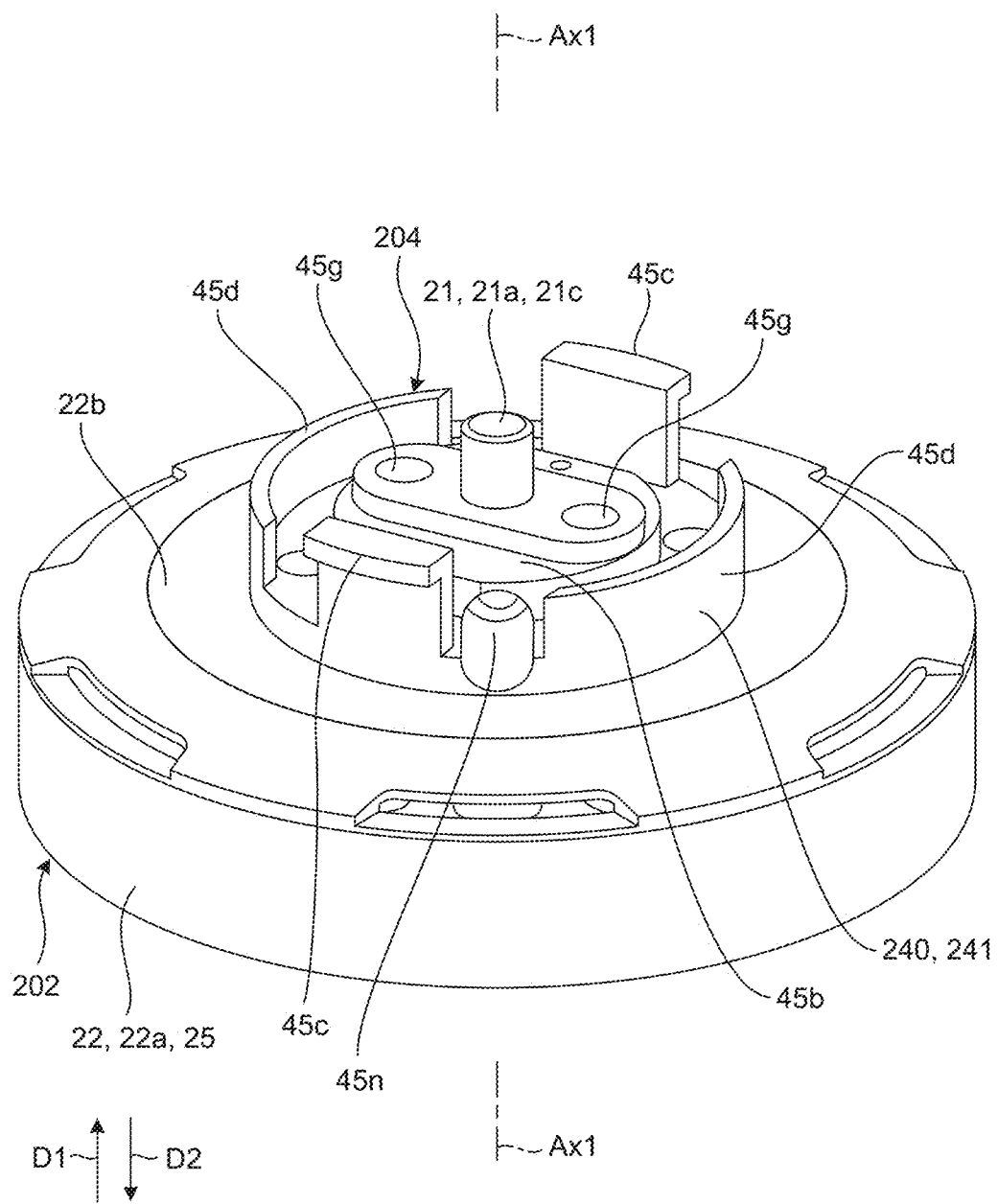
FIG. 27 is a perspective view of the motor and a part of the propeller attaching device according to the second embodiment, viewed obliquely from above the motor and the propeller attaching device.

FIG. 24 is a perspective view of the motor 202 and the propeller attaching device 204 according to the second embodiment, viewed obliquely from above the motor 202 and the propeller attaching device 204. FIG. 25 is a perspective view of the motor 202 and the propeller attaching device 204 according to the second embodiment, viewed obliquely from below the motor 202 and the propeller attaching device 204. FIG. 26 is an exploded perspective view of the motor 202 and the propeller attaching device 204 according to the second embodiment, viewed obliquely from above the motor 202 and the propeller attaching device 4. FIG. 27 is a perspective view of the motor 202 and a part of the propeller attaching device 4 according to the second embodiment, viewed obliquely from above the motor 202 and the propeller attaching device 4.

As illustrated in FIGS. 24 to 27, the motor 202 is different from the motor 2 in that the motor 202 does not include the protruding portion 22c.

Furthermore, the propeller attaching device 204 includes a coupler 240 instead of the coupler 40. The coupler 240 includes a base 241 instead of the base 41. The bayonet lower member 45 of the base 241 is integrally formed with the lid 22b that is a member of the rotor 22 of the motor 2. The propeller attaching device 204 and the lid 22b constitute an assembly. Furthermore, In the base 241, the arrangement direction of the through-holes 45f and 45g is different from the arrangement direction of the through-holes 45f and 45g of the base 41. Specifically, the arrangement direction of the through-holes 45f and 45g of the base 241 is orthogonal to the arrangement direction of the two first receiving portions 45c. Furthermore, the base 241 is provided with a hole 45n. A screw member (not illustrated) that fixes the bayonet lower member 45 and the output shaft 21 is inserted into the hole 45n.

[2-3. Propeller Attaching Method and Propeller Removing Method]

The propeller attaching method and the propeller removing method that use the propeller attaching device 204 having such a configuration are similar to the propeller attaching method and the propeller removing method that use the propeller attaching device 4.

[2-4. Effects]

As described above, in the present embodiment, the bayonet lower member 45 (first base member) is integrally formed with the lid 22b (member) of the rotor 22 of the motor 2.

According to such a configuration, the thickness of the bayonet lower member 45 is readily increased as compared with a configuration in which the bayonet lower member 45 is not integrally formed with the lid 22b of the rotor 22 of the motor 2, and thus, the strength and rigidity of the bayonet lower member 45 can be readily increased. Furthermore, this configuration makes it possible to reduce the hardness of the material of the bayonet lower member 45, and the workability of the bayonet lower member 45 can be readily improved. Therefore, cost reduction can be achieved. Furthermore, the number of components can be reduced. In addition, it is easy to suppress the eccentricity of the propeller attaching device 204 and the propeller 3 relative to the motor 2.

[2-5. Modifications]

Figure 28:
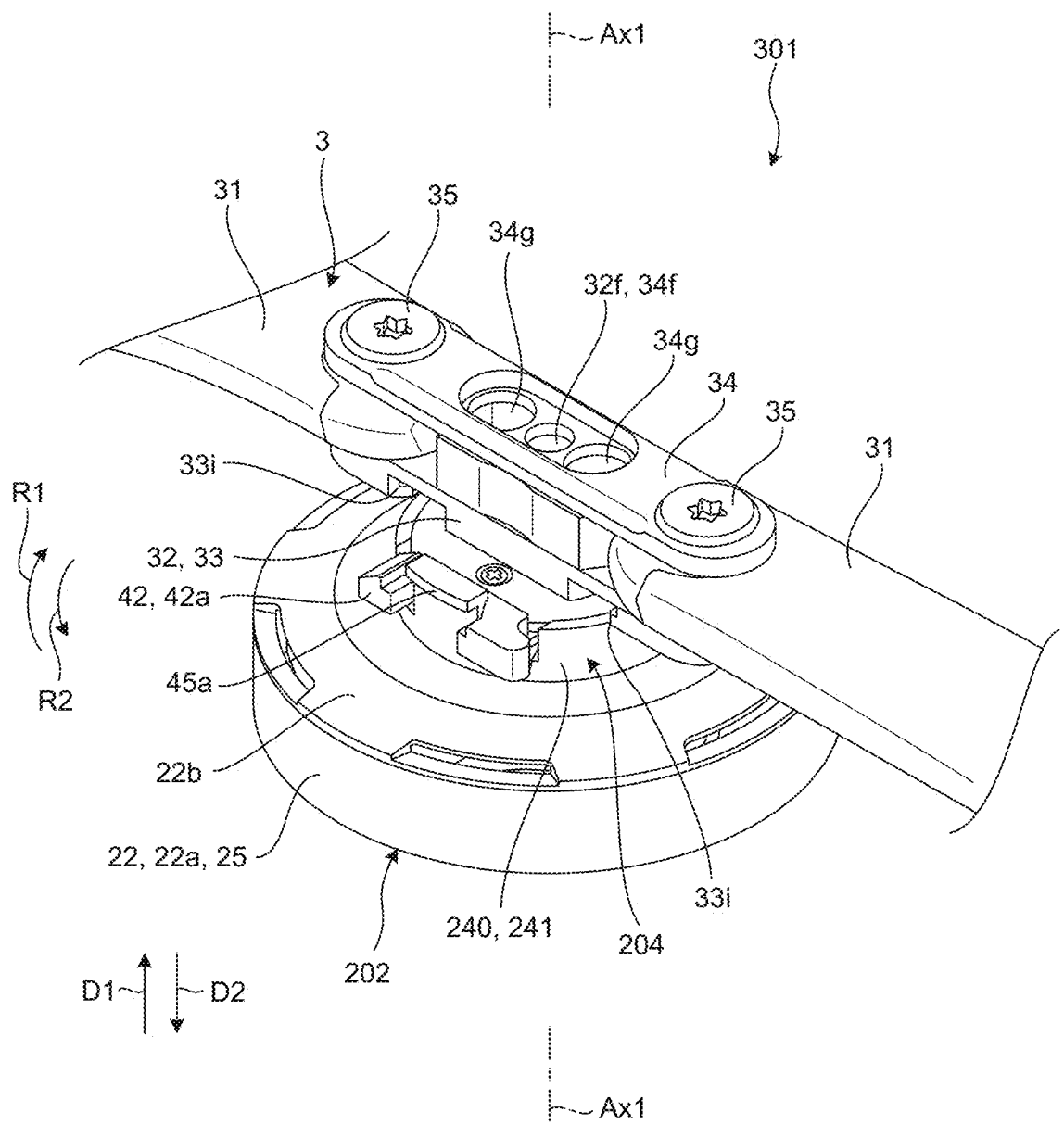
FIG. 28 is a perspective view of a propeller propulsion system according to a modification of the second embodiment, viewed obliquely from above the propeller propulsion system.

FIG. 28 is a perspective view of a propeller propulsion system 301 according to a modification of the first embodiment, viewed obliquely from above the propeller propulsion system 301.

In the present modification, the propeller 3 is fixed to the rotor 22 of the motor 2 by connectors (not illustrated) without using the first receiving portion 45c and the second receiving portion 42a.

It should be noted that the effects described herein are merely examples and are not intended to restrict the present disclosure, and other effects may be provided.

Note that the present technology can also employ the following configurations.

(1)

A propeller attaching device comprising:
  a coupler that includes a base and a first receiving portion, the base having a through-hole into which a protruding portion of an output shaft of a motor is inserted, the protruding portion including one end of the output shaft, the base being coupled to the output shaft, the first receiving portion allowing attachment/detachment of an attachment portion of a propeller by rotation of the propeller in a circumferential direction of the output shaft relative to the base, the propeller having the attachment portion and provided with an opening into which the protruding portion protruding from the through-hole is inserted, the first receiving portion receiving the attachment portion in an axial direction of the output shaft to restrict movement of the propeller in the axial direction, the coupler rotating integrally with the output shaft;
  a movable body that includes a second receiving portion, is supported by the coupler to be movable in the axial direction between an attachment/detachment position and a restriction position, and rotates integrally with the coupler, the attachment/detachment position allowing attachment/detachment of the attachment portion to/from the first receiving portion, the restriction position being located in a first direction relative to the attachment/detachment position, the first direction extending from the other end portion of the output shaft toward the one end portion in the axial direction of the output shaft, the restriction position receiving the attachment portion attached to the first receiving portion in the circumferential direction by the second receiving portion to restrict the rotation of the propeller in the circumferential direction relative to the base; and
  a resilient body that presses the movable body in the first direction and rotates integrally with the coupler.

(2)

The propeller attaching device according to (1), wherein the movable body has an inclined surface that is circumferentially inclined in the first direction while extending on one side in the circumferential direction, is moved from the restriction position to the attachment/detachment position against resilient force of the resilient body, in response to pressing of the inclined surface by the propeller rotating to one side in the circumferential direction, upon attaching the attachment portion to the first receiving portion, and is moved from the attachment/detachment position to the restriction position by the resilient force of the resilient body when the inclined surface is released from the pressing by the propeller.

(3)

The propeller attaching device according to (2), wherein the inclined surface is provided at the second receiving portion.

(4)

The propeller attaching device according to any one of (1) to (3), wherein the movable body has an operation surface being flat, extending in the circumferential direction, and facing in the first direction.

(5)

The propeller attaching device according to (4), wherein the operation surface is provided at the second receiving portion.

(6)

The propeller attaching device according to any one of (1) to (5), further comprising
a mating portion,
wherein a rotation direction is set for the propeller,
the attachment portion includes a mating portion on the propeller side that has a shape corresponding to the rotation direction, and
the mating portion is configured to be combined with the mating portion on the propeller side of the propeller having a defined rotation direction, and is not configured to be combined with the mating portion on the propeller side of the propeller having the rotation direction opposite to the defined rotation direction.

(7)

The propeller attaching device according to (6), wherein the mating portion is provided at a second receiving portion.

(8)

The propeller attaching device according to any one of (1) to (7), wherein
the coupler includes a first base member that includes a part of the base, and the first receiving portion and that is coupled to the output shaft, and a second base member that includes a part of the first base member and is fixed to the first base member,
a part of the movable body is positioned between the first base member and the second base member,
the second receiving portion is positioned outside the first base member and the second base member, and
the resilient body is interposed between the first base member and the part of the movable body.

(9)

The propeller attaching device according to (8), wherein the first base member is a separate member from the motor.

(10)

The propeller attaching device according to (8), wherein the first base member is integrally formed with a member of a rotor of the motor.

(11)

The propeller attaching device according to any one of (1) to (10), wherein one of the attachment portion and the first receiving portion has a protrusion, and the other of the attachment portion and the first receiving portion is provided with a groove portion into which the protrusion is inserted and that extends in the circumferential direction.

(12)

The propeller attaching device according to (11), wherein the first receiving portion includes the protrusion, and the attachment portion is provided with the groove portion.

(13)

The propeller attaching device according to any one of (1) to (12), wherein the first receiving portion includes an extension portion that extends from the base in the axial direction and a protrusion that protrudes from the extension portion to the outside of the output shaft in a radial direction and to which the attachment portion is attached.

(14)

The propeller attaching device according to (13), wherein the extension portion extends from the base in the first direction and guides the second receiving portion in the axial direction.

(15)

The propeller attaching device according to any one of (1) to (14), wherein
a plurality of the first receiving portions and a plurality of the second receiving portions are provided, and
the movable body includes the plurality of the second receiving portions and a connection portion that connects the plurality of the second receiving portions.

(16)

The propeller attaching device according to (15), wherein
the first receiving portion includes two first receiving portions and the second receiving portion includes two second receiving portions, and
the two first receiving portions are positioned on the opposite sides relative to the output shaft, and
the two second receiving portions are positioned on the opposite sides relative to the output shaft.

(17)

A propeller attaching method for mounting a propeller to a motor by using a propeller attaching device,
the propeller attaching device including:
a coupler that includes a base and a first receiving portion, the base having a through-hole into which a protruding portion of an output shaft of a motor is inserted, the protruding portion including one end of the output shaft, the base being coupled to the output shaft, the first receiving portion allowing attachment/detachment of an attachment portion of a propeller by rotation of the propeller in a circumferential direction of the output shaft relative to the base, the propeller having the attachment portion and provided with an opening into which the protruding portion protruding from the through-hole is inserted, the first receiving portion receiving the attachment portion in an axial direction of the output shaft to restrict movement of the propeller in the axial direction, the coupler rotating integrally with the output shaft;
a movable body that includes a second receiving portion, is supported by the coupler to be movable in the axial direction between an attachment/detachment position and a restriction position, and rotates integrally with the coupler, the attachment/detachment position allowing attachment/detachment of the attachment portion to/from the first receiving portion, the restriction position being located in a first direction relative to the attachment/detachment position, the first direction extending from the other end portion of the output shaft toward the one end portion in the axial direction of the output shaft, the restriction position receiving the attachment portion attached to the first receiving portion in the circumferential direction by the second receiving portion to restrict the rotation of the propeller in the circumferential direction relative to the base; and
a resilient body that presses the movable body in the first direction and rotates integrally with the coupler,
the method comprising:
an insertion step of inserting the protruding portion of the propeller protruding from the through-hole of the base, into the opening;
a first movement step of moving the second receiving portion, from the restriction position to the attachment/detachment position against a resilient force of the resilient body;

a rotation step of rotating the propeller with the output shaft inserted into the opening, in the circumferential direction to attach the attachment portion to the second receiving portion; and a second movement step of moving the second receiving portion from the attachment/detachment position to the restriction position by the resilient force of the resilient body.

(18)

The propeller attaching method according to (17), in which the movable body has an inclined surface that is circumferentially inclined in the first direction while extending on one side in the circumferential direction, is moved from the restriction to the attachment/detachment position against resilient force of the resilient body, in response to pressing of the inclined surface by the propeller rotating to one side in the circumferential direction, upon attaching the attachment portion to the first receiving portion, and is moved from the attachment/detachment position to the restriction position by the resilient force of the resilient body when the inclined surface is released from the pressing by the propeller.

(19)

The propeller attaching method according to (18), in which the inclined surface is provided at the second receiving portion.

(20)

The propeller attaching method according to any of (17) to (19), in which the movable body has an operation surface being flat, extending in the circumferential direction, and facing in the first direction.

(21)

The propeller attaching method according to (4), in which the operation surface is provided at the second receiving portion.

(22)

The propeller attaching method according to any of (17) to (21), in which a mating portion is provided, a rotation direction is set for the propeller, the attachment portion includes a mating portion on the propeller side that has a shape corresponding to the rotation direction, and the mating portion is configured to be combined with the mating portion on the propeller side of the propeller having a defined rotation direction, and is not configured to be combined with the mating portion on the propeller side of the propeller having the rotation direction opposite to the defined rotation direction.

(23)

The propeller attaching method according to (22), in which the mating portion is provided at a second receiving portion.

(24)

The propeller attaching method according to any of (17) to (23), in which the coupler includes a first base member that includes a part of the base, and the first receiving portion and that is coupled to the output shaft, and a second base member that includes a part of the first base member and is fixed to the first base member, a part of the movable body is positioned between the first base member and the second base member, the second receiving portion is positioned outside the first base member and the second base member, and the resilient body is interposed between the first base member and the part of the movable body.

(25)

The propeller attaching method according to (24), in which the first base member is a separate member from the motor.

(26)

The propeller attaching method according to (24), in which the first base member is integrally formed with a member of a rotor of the motor.

(27)

The propeller attaching method according to any of (1) to (26), in which one of the attachment portion and the first receiving portion has a protrusion, and the other of the attachment portion and the first receiving portion is provided with a groove portion into which the protrusion is inserted and that extends in the circumferential direction.

(28)

The propeller attaching method according to (27), in which the first receiving portion includes the protrusion, and the attachment portion is provided with the groove portion.

(29)

The propeller attaching method according to any of (17) to (28), in which the first receiving portion includes an extension portion that extends from the base in the axial direction and a protrusion that protrudes from the extension portion to the outside of the output shaft in a radial direction and to which the attachment portion is attached.

(30)

The propeller attaching method according to (29), in which the extension portion extends from the base in the first direction and guides the second receiving portion in the axial direction.

(31)

The propeller attaching method according to any of (17) to (30), in which a plurality of the first receiving portions and a plurality of the second receiving portions are provided, and the movable body includes the plurality of the second receiving portions and a connection portion that connects the plurality of the second receiving portions.

(32)

The propeller attaching method according to (31), in which the first receiving portion includes two first receiving portions and the second receiving portion includes two second receiving portions, and the two first receiving portions are positioned on the opposite sides relative to the output shaft, and the two second receiving portions are positioned on the opposite sides relative to the output shaft.

REFERENCE SIGNS LIST 2, 202 MOTOR
3, 3A PROPELLER
4, 4A, 204 PROPELLER ATTACHING DEVICE
21 OUTPUT SHAFT
21a ONE END
21c PROTRUDING PORTION
22 ROTOR
22b LID (MEMBER)
32f THROUGH-HOLE (OPENING)
33a ATTACHMENT PORTION
33jc GROOVE PORTION

33r SURFACE (MATING PORTION ON PROPELLER SIDE)
40, 240 COUPLER
41, 241 BASE
42 MOVABLE BODY
42a SECOND RECEIVING PORTION
42b CONNECTION PORTION
42cf INCLINED SURFACE
42dd SURFACE (MATING PORTION)
42fa OPERATION SURFACE
43 RESILIENT BODY
45 BAYONET LOWER MEMBER (FIRST BASE MEMBER)
45c FIRST RECEIVING PORTION
45f THROUGH-HOLE
45h EXTENSION PORTION
45i PROTRUSION
46 BAYONET UPPER MEMBER (SECOND BASE MEMBER)
D1 FIRST DIRECTION
D2 SECOND DIRECTION
R1, R2 ROTATION DIRECTION
S1 INSERTION STEP
S2 FIRST MOVEMENT STEP
S3 ROTATION STEP
S4 SECOND MOVEMENT STEP

The invention claimed is:

1. A propeller attaching device comprising:
a coupler that includes a base and a first receiving portion, the base having a through-hole into which a protruding portion of an output shaft of a motor is inserted, the protruding portion including one end of the output shaft, the base being coupled to the output shaft, the first receiving portion allowing attachment/detachment of an attachment portion of a propeller by rotation of the propeller in a circumferential direction of the output shaft relative to the base, the propeller having the attachment portion and being provided with an opening into which the protruding portion protruding from the through-hole is inserted, the first receiving portion receiving the attachment portion in an axial direction of the output shaft to restrict movement of the propeller in the axial direction, the coupler rotating integrally with the output shaft;
a movable body that includes a second receiving portion, is supported by the coupler to be movable in the axial direction between an attachment/detachment position and a restriction position, and rotates integrally with the coupler, the attachment/detachment position allowing attachment/detachment of the attachment portion to/from the first receiving portion, the restriction position being located in a first direction relative to the attachment/detachment position, the first direction extending from the other end portion of the output shaft toward the one end portion in the axial direction of the output shaft, the restriction position receiving the attachment portion attached to the first receiving portion in the circumferential direction by the second receiving portion to restrict the rotation of the propeller in the circumferential direction relative to the base; and
a resilient body that presses the movable body in the first direction and rotates integrally with the coupler,
wherein the movable body has an inclined surface that is circumferentially inclined in the first direction while extending on one side in the circumferential direction, is moved from the restriction position to the attachment/detachment position against resilient force of the resilient body, in response to pressing of the inclined surface by the propeller rotating to one side in the circumferential direction, upon attaching the attachment portion to the first receiving portion, and is moved from the attachment/detachment position to the restriction position by the resilient force of the resilient body when the inclined surface is released from the pressing by the propeller.

2. The propeller attaching device according to claim 1, wherein the inclined surface is provided at the second receiving portion.

3. The propeller attaching device according to claim 1, wherein the movable body has an operation surface being flat, extending in the circumferential direction, and facing in the first direction.

4. The propeller attaching device according to claim 3, wherein the operation surface is provided at the second receiving portion.

5. The propeller attaching device according to claim 1, further comprising a mating portion,
wherein a rotation direction is set for the propeller,
the attachment portion includes a mating portion on the propeller side that has a shape corresponding to the rotation direction, and
the mating portion is configured to be combined with the mating portion on the propeller side of the propeller having a defined rotation direction, and is not configured to be combined with the mating portion on the propeller side of the propeller having the rotation direction opposite to the defined rotation direction.

6. The propeller attaching device according to claim 5, wherein the mating portion is provided at a second receiving portion.

7. The propeller attaching device according to claim 1, wherein the coupler includes a first base member that includes a part of the base, and the first receiving portion and that is coupled to the output shaft, and a second base member that includes a part of the first base member and is fixed to the first base member,
a part of the movable body is positioned between the first base member and the second base member,
the second receiving portion is positioned outside the first base member and the second base member, and
the resilient body is interposed between the first base member and the part of the movable body.

8. The propeller attaching device according to claim 7, wherein the first base member is a separate member from the motor.

9. The propeller attaching device according to claim 7, wherein the first base member is integrally formed with a member of a rotor of the motor.

10. The propeller attaching device according to claim 1, wherein one of the attachment portion and the first receiving portion has a protrusion, and
the other of the attachment portion and the first receiving portion is provided with a groove portion into which the protrusion is inserted and that extends in the circumferential direction.

11. The propeller attaching device according to claim 10, wherein the first receiving portion includes the protrusion, and
the attachment portion is provided with the groove portion.

12. The propeller attaching device according to claim 1, wherein the first receiving portion includes an extension portion that extends from the base in the axial direction and a protrusion that protrudes from the extension portion to the outside of the output shaft in a radial direction and to which the attachment portion is attached.

13. The propeller attaching device according to claim 12, wherein the extension portion extends from the base in the first direction and guides the second receiving portion in the axial direction.

14. The propeller attaching device according to claim 1, wherein a plurality of the first receiving portions and a plurality of the second receiving portions are provided, and
the movable body includes the plurality of the second receiving portions and a connection portion that connects the plurality of the second receiving portions.

15. The propeller attaching device according to claim 14, wherein the first receiving portion includes two first receiving portions and the second receiving portion includes two second receiving portions, and
the two first receiving portions are positioned on the opposite sides relative to the output shaft, and
the two second receiving portions are positioned on the opposite sides relative to the output shaft.

16. A propeller attaching method for mounting a propeller to a motor by using a propeller attaching device,
the propeller attaching device including:
a coupler that includes a base and a first receiving portion, the base having a through-hole into which a protruding portion of an output shaft of a motor is inserted, the protruding portion including one end of the output shaft, the base being coupled to the output shaft, the first receiving portion allowing attachment/detachment of an attachment portion of a propeller by rotation of the propeller in a circumferential direction of the output shaft relative to the base, the propeller having the attachment portion and provided with an opening into which the protruding portion protruding from the through-hole is inserted, the first receiving portion receiving the attachment portion in an axial direction of the output shaft to restrict movement of the propeller in the axial direction, the coupler rotating integrally with the output shaft;
a movable body that includes a second receiving portion, is supported by the coupler to be movable in the axial direction between an attachment/detachment position and a restriction position, and rotates integrally with the coupler, the attachment/detachment position allowing attachment/detachment of the attachment portion to/from the first receiving portion, the restriction position being located in a first direction relative to the attachment/detachment position, the first direction extending from the other end portion of the output shaft toward the one end portion in the axial direction of the output shaft, the restriction position receiving the attachment portion attached to the first receiving portion in the circumferential direction by the second receiving portion to restrict the rotation of the propeller in the circumferential direction relative to the base; and
a resilient body that presses the movable body in the first direction and rotates integrally with the coupler,
wherein the movable body has an inclined surface that is circumferentially inclined in the first direction while extending on one side in the circumferential direction, is moved from the restriction position to the attachment/detachment position against resilient force of the resilient body, in response to pressing of the inclined surface by the propeller rotating to one side in the circumferential direction, upon attaching the attachment portion to the first receiving portion, and is moved from the attachment/detachment position to the restriction position by the resilient force of the resilient body when the inclined surface is released from the pressing by the propeller,
the method comprising:
an insertion step of inserting the protruding portion of the propeller protruding from the through-hole of the base, into the opening;
a first movement step of moving the second receiving portion, from the restriction position to the attachment/detachment position against a resilient force of the resilient body;
a rotation step of rotating the propeller with the output shaft inserted into the opening, in the circumferential direction to attach the attachment portion to the second receiving portion; and
a second movement step of moving the second receiving portion from the attachment/detachment position to the restriction position by the resilient force of the resilient body.

\* \* \* \* \*